United States Patent [19]

Nozawa et al.

[11] Patent Number: 5,668,640
[45] Date of Patent: Sep. 16, 1997

[54] FACSIMILE EQUIPMENT

[75] Inventors: Masako Nozawa, Urawa; Yumiko Yamaguchi, Fuchu, both of Japan

[73] Assignee: Kabushiki Kaisha Toshiba, Kawasaki, Japan

[21] Appl. No.: 361,166

[22] Filed: Dec. 21, 1994

Related U.S. Application Data

[63] Continuation of Ser. No. 960,698, Oct. 14, 1992, abandoned.

[30] Foreign Application Priority Data

Oct. 14, 1991 [JP] Japan .................................. 3-264746
Nov. 19, 1991 [JP] Japan .................................. 3-303303

[51] Int. Cl.$^6$ ...................................................... H04N 1/00
[52] U.S. Cl. .......................... 358/434; 358/402; 358/438; 358/440; 379/100.01
[58] Field of Search ................................ 358/407, 440, 358/400, 403, 402, 404, 434, 405, 438, 436, 435; 379/100; H04N 1/00

[56] References Cited

U.S. PATENT DOCUMENTS

| | | | |
|---|---|---|---|
| 4,058,838 | 11/1977 | Grager et al. | 358/425 |
| 5,001,572 | 3/1991 | Hashimoto et al. | 358/440 |
| 5,050,208 | 9/1991 | Wada | 379/100 |
| 5,095,373 | 3/1992 | Hisano | 358/403 |
| 5,095,445 | 3/1992 | Sekiguchi | 358/400 |
| 5,216,517 | 6/1993 | Kinoshita | 358/400 |
| 5,301,035 | 4/1994 | Hayafune | 358/403 |
| 5,341,413 | 8/1994 | Hori et al. | 358/440 |
| 5,384,830 | 1/1995 | Ide | 358/440 |
| 5,384,836 | 1/1995 | Otsuka | 358/440 |
| 5,392,131 | 2/1995 | Umeno | 358/440 |
| 5,392,133 | 2/1995 | Nakajima | 358/440 |
| 5,459,584 | 10/1995 | Gordon et al. | 358/434 |

OTHER PUBLICATIONS

The Complete PC, Inc.—The Complete FAX/9600, Oct. 1988.
Bit Software, Inc.—BitFax for Windows—Feb. 1992—pp. 4–1 to 5–9.

*Primary Examiner*—Edward L. Coles, Sr.
*Assistant Examiner*—Madeleine A. V. Nguyen
*Attorney, Agent, or Firm*—Finnegan, Henderson, Farabow, Garrett & Dunner, L.L.P.

[57] ABSTRACT

A facsimile equipment in which a document data received from another facsimile equipment is once stored in an image memory and the document data can be transmitted to another facsimile equipment directly from the image memory without printing out the received document data and then reading the printed document. Further, the facsimile equipment also has a function of transmitting the document data in a circulation manner by transmitting circulation table together with the document data. By defining the handling of the circulation table in each of the destination facsimile equipments, the document data can be automatically circulated among the facsimile equipments.

12 Claims, 18 Drawing Sheets

15

| DESTINATION NAME | DESTINATION NUMBER (FAX NO.) | GROUP ATTRIBUTE |
|---|---|---|
| A | 01-2345-6789 | 1 |
| B | 01-3579-2468 | 1 |
| C | 03-4567-8901 | 0 |
| D | 0123-45-6987 | 0 |
| E | 0078-91-2345 | 1 |
| F | 06-7890-1234 | 0 |
| G | 01-2233-4455 | 1 |
| H | 01-6677-8899 | 1 |
| I | 03-4444-5556 | 1 |
| J | 0429-92-9073 | 0 |
| ⋮ | ⋮ | ⋮ |

FIG.3

A FACSIMILE EQUIPMENT

This application is a continuation of application Ser. No. 07/960,698, filed Oct. 14, 1992, now abandoned.

BACKGROUND OF THE INVENTION

1. Field of the Invention

The present invention relates to a facsimile equipment suitable for use in a facsimile system in which every data on received documents are once stored in an image memory enabling to display a desired part of the document in a display unit for confirmation of its contents and more particularly, to a facsimile equipment in which the document data stored in the image memory can be transmitted directly from the image memory to another facsimile equipment, thus realizing remarkable saving of paper resources and time necessary for the transmitting operation.

2. Description of the Related Art

There has recently been proposed a facsimile equipment in which all document data received from any sender facsimile equipment through a telephone line are once stored in an image memory and a desired part of the document data is visually displayed on a display unit to allow the confirmation of whether printing out of the displayed part is necessary, whereby only necessary parts of the document data can be selectively printed.

However, in such a conventional facsimile equipment, when it is desired to transmit the received document to another facsimile equipment after the received document is displayed on the display unit, the document data must be printed out by a printer and thereafter read by a document reader to generate image data and then to transmit the image data to a desired facsimile equipment.

For the conventional facsimile equipment capable of displaying received documents, when it is desired to transmit a received document data to another facsimile equipment, the following operations (1) to (3) are performed.

(1) Printing document data by a printer.
(2) Converting the printed document into image data by a document reader.
(3) Inputting address of a destination facsimile equipment and transmitting the image data to the destination.

As a result, the conventional facsimile equipment is not only unable to avoid consuming paper resources but also he facsimile equipment also is complicated in the transmitting operations.

When the received document data is transmitted through the above transmitting operations, the image quality is decreased because:

(1) The quality of the image data to be transmitted is degraded depending on the resolution of the printer.
(2) The printed image is again read by the document reader, thus degrading the image quality depending on the resolution of the document reader.

When the transmission is repeated many times, the quality of image becomes so poor that it is difficult to read the document.

SUMMARY OF THE INVENTION

In view of such circumstances, it is an object of the present invention to provide a facsimile equipment which allows transmission of document data stored in an image memory directly from the image memory to another facsimile equipment, whereby the image quality of the document data to be transmitted can be maintained always at a suitable level, and paper resources and time necessary for the transmitting operations can be saved to a large extent.

Another object of the present invention is to provide a facsimile equipment which can realize reliable and efficient operations even by the repetitive transmission in a so-called "circular transmission".

In accordance with an aspect of the present invention, the above objects can be attained by providing a facsimile equipment which comprises, in addition to the aforementioned image memory and display unit;

(a) management data memory means for registering therein pointers and various sorts of attribute data for identification of the respective document data stored in the image memory,
(b) input means for inputting a command for display of a list of the document data stored in the image memory,
(c) display control means, in response to an input of the document data list display command from the input means (b), for displaying on the display unit a list of the attribute data of respective document data registered in the management data memory means (a) in a predetermined format,
(d) input means for selectively specifying a single or a plurality of document data on the basis of the attribute data in the displayed list,
(e) input means for specifying and inputting one or a plurality of facsimile transmission destinations,
(f) calling control means for calling the facsimile transmission destination specified by the input means (e), and
(g) transmission control means for specifying the document data selected by the input means (d) on the basis of the pointers registered in the management data memory means (a), reading out the specified document data from the image memory, and transmitting the read-out document data to the facsimile transmission destination connected to the facsimile equipment through the calling operation of the calling control means.

With this construction, the facsimile equipment which stores a received document data in the image memory can transmit the stored data directly from the image memory to another facsimile equipment.

Thus, when it is desired to transmit the received document data to another facsimile equipment, it is unnecessary to print the received document data and to read the printed document. Therefore, paper resources and time for the transmitting operations can be remarkably saved. Further, since printing and reading operations are unnecessary in transmitting a received data to another facsimile equipment, degrading the image quality can be avoided to a minimum.

In accordance with another aspect of the present invention, there is provided a facsimile equipment which further comprises, in addition to the above constituent elements;

(h) input means for specifying and inputting a plurality of facsimile transmission destinations as circular destinations of the selected document data according to its circulation order,
(i) management data memory means for registering therein the specified circular destinations and circulation order as a circulation table data, and
(j) retrieval means for sequentially retrieving the circular destinations specified by the input means (h) on the basis of the registered circulation table data according to the specified circulation order. And the calling control means (f) calls the retrieved circular destinations in an order retrieved by the retrieval means (j) until interconnection to the circular destination is successfully attained; and the transmission control means (g) transmits the circulation table data together with the document data to the circular destination connected to the facsimile equipment through the calling operation of the calling control means (f).

The facsimile equipment with this construction is suitably used as a circular starting station in the circular transmission.

In accordance with still further aspect of the present invention, there is provided a facsimile equipment which further comprises, in addition to the aforementioned constituent elements;

(k) management data memory means for separately storing therein circulation table data indicative of the circular destinations of the received document data and circulation order when the circulation table data are attached to the received document data, (l) circulation table data updating means for updating contents of the stored circulation table data corresponding to its own station of the circular destination as the finished circulation of the own station, and (m) retrieval means for sequentially retrieving the circular destinations to be circulated next to its own station on the basis of the circular destinations and circulation order specified by the updated circulation table data.

In the facsimile equipment with this construction, the calling control means (f) continues to call the retrieved circular destinations in the retrieving order by the retrieval means (m) until interconnection to the circular destination is successfully attained; and the transmission control means (g) specifies and reads one of the document data stored in the image memory which is received together with the circulation table data on the basis of the pointers registered in the management data memory means (a) and transmits both the updated circulation table data and the read circular document data to the circular destination connected to the facsimile equipment through the calling operation of the calling control means (f).

The facsimile equipment with this construction is used suitably as a relay station in the circular transmission.

By specifying a circulation table data indicative of circular destinations and circulating order and by determining a handling manner of the circulation table data for each of the circular member stations, the circular document data can be automatically circulated reliably and efficiently among the facsimile equipments specified as the circular destinations.

The facsimile equipment serving as a circular starting station can be sufficiently constructed by comprising:

(A) document reading means for reading an input document to generate document data, (B) input means for specifying and inputting a plurality of facsimile transmission destinations as the circular destinations of the generated document data according to its circulation order, (C) management data memory means for registering therein the specified circular destinations and circulation order as circulation table data, (D) retrieval means for sequentially retrieving the circular destinations specified by the input means on the basis of the registered circulation table data according to the specified circulation order, (E) calling control means for calling the retrieved circular destination in an order retrieved by the retrieval means (D) until interconnection to the circular destination is successfully attained, and (F) transmission control means for transmitting both the circulation table data and the document data to the circular destination connected to the facsimile equipment through the calling operation of the calling control means (E).

A facsimile equipment according to the present invention may have a construction that, at the time of performing the above circular transmitting operation, when the dial data of its circular destinations are not previously registered, the dial data of the circular destinations are transmitted together with the circulation table data so that each circular destination can automatically dial the next circular destination on the basis of the transmitted dial data.

BRIEF DESCRIPTION OF THE DRAWINGS

In the accompanying drawings,

FIG. 3 is a diagram schematically illustrating an example of a structure of a destination data memory in FIG. 1 wherein contents of destination data are registered;

DESCRIPTION OF THE PREFERRED EMBODIMENTS

Figure 1:
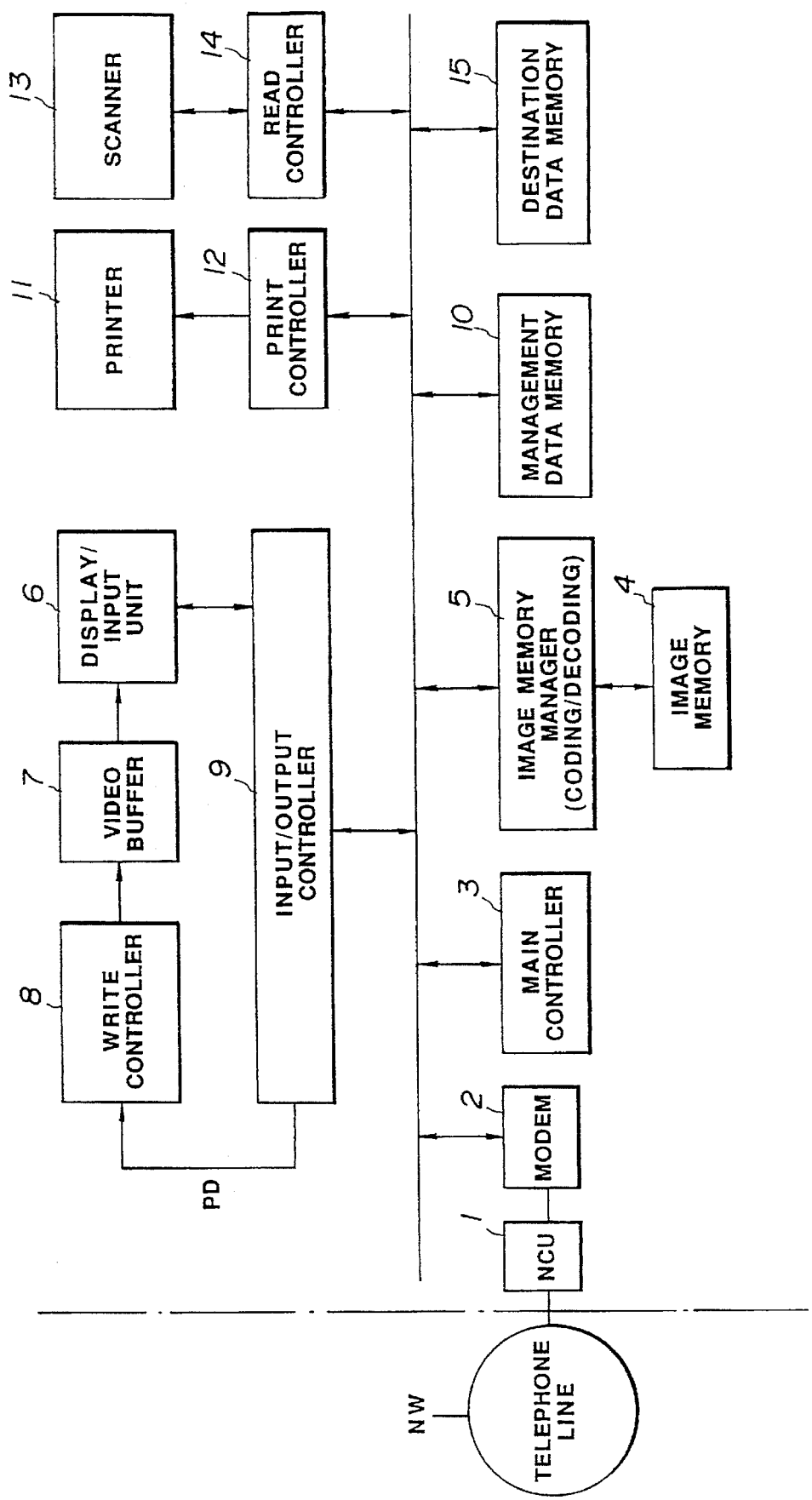
FIG. 1 is a block diagram of an arrangement of a facsimile equipment in accordance with an embodiment of the present invention.

FIG. 1 is a block diagram of a facsimile equipment in accordance with an embodiment of the present invention in which the facsimile equipment includes document image display function of once storing all document data received in an image memory and visually displaying part of the document data on a display unit to confirm the contents of the document data as well as a function of transmitting the document data directly from the memory or transmitting a circular. This function forms major part of the present invention.

More specifically, the facsimile equipment shown in FIG. 1 includes a network control unit (NCU) 1 for seizing or releasing a telephone line NW, a modem 2 for modulating or demodulating the data of a document, a main controller 3 for performing general control over the respective parts of the facsimile equipment, an image memory 4 for storing document data received through the facsimile equipment, an image memory manager 5 for managing writing of the document data demodulated at the modem 2 to the image memory 4 and reading of the document data stored in the image memory 4, a display/input unit 6 having a display part such as a liquid crystal display for displaying the document data stored in the image memory 4 and also having an input part for inputting various sorts of commands through operating keys and a touch sensor panel provided on the screen of the display, a video buffer 7 for temporarily storing the document data displayed on the display/input unit 6 as a bit image data, a write controller 8 for controlling writing of the document data designated to be temporarily stored in the video buffer 7 or to be displayed on the display/input unit 6 to the video buffer 7, an input/output controller 9 for providing a displaying data and a control data to the write controller 8 to control the image display of the display/input unit 6 and also decoding a user command received through the display/input unit 6 and transmitting it to the main controller 3, a management data memory 10 for storing therein mainly management data such as an acceptation number or a communication record attached to the received document data, a printer 11 for printing the document data designated to be printed on recording paper, a print controller 12 for controlling the start of the printer or other operations associated therewith, a scanner 13 for reading a picture image on an input document, a read controller 14 for controlling the original reading operation of the scanner 13 according to a command received from the main controller 3, and a destination data memory 15 for registering the dial data of a plurality of destinations to be facsimile transmitted.

A document data is inputted to the facsimile equipment through the NCU 1 and demodulated at the modem 2 usually as a so-called raw data, that is, a data that is not subjected to any compression or like operations. In the illustrated embodiment, the document data, when stored in the image memory 4, is subjected through the image memory manager 5 to compressing operation such as based on modified READ (MMR) coding. This results in that a data storage efficiency in the image memory 4 can be largely increased. The document data thus stored in the image memory 4 has a memory model structure as shown in FIG. 2.

Figure 2:
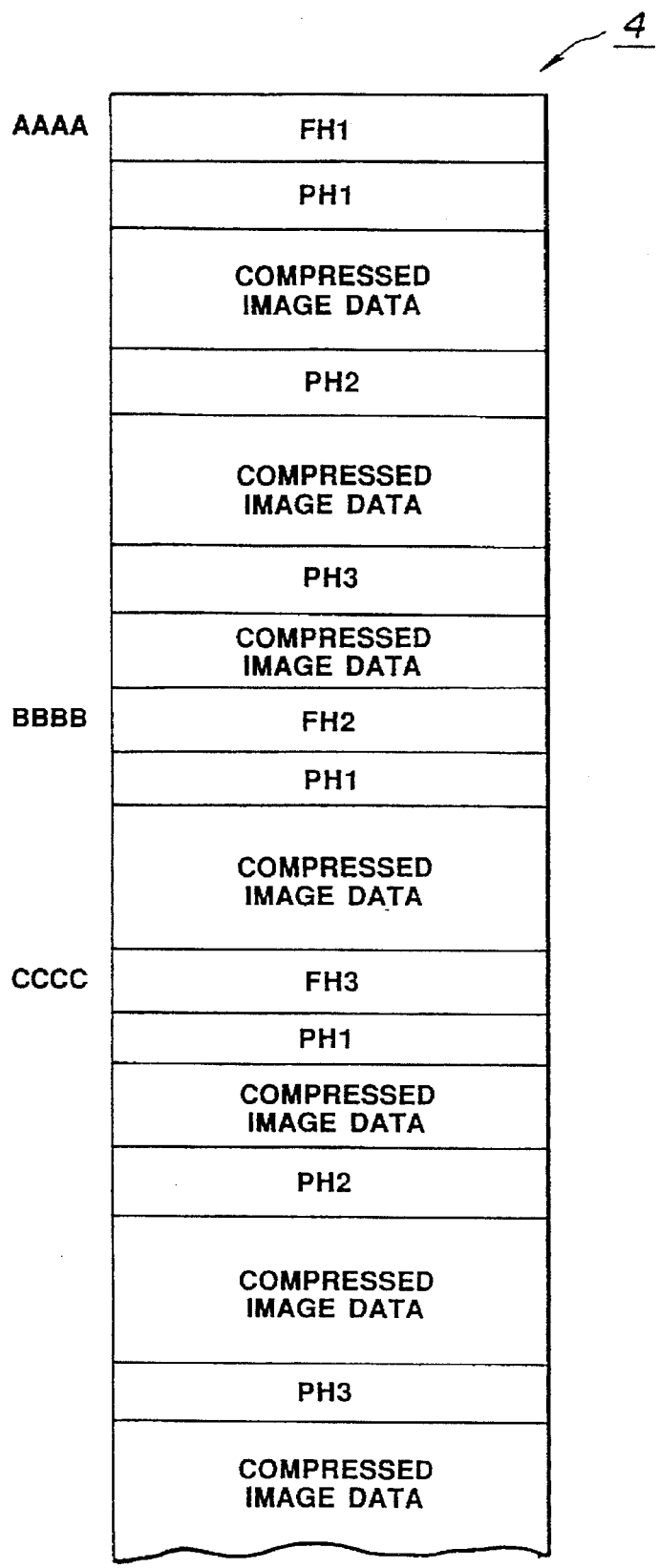
FIG. 2 is a diagram schematically illustrating an example of a structure of an image memory in FIG. 1 wherein a plurality of document data received in facsimile communication are stored.

In FIG. 2, reference symbols FH1, FH2, ... denote file headers attached to the received document data files in associated with the above acceptation numbers of the files; while symbols PH1, PH2, ... denote page headers attached to each of these files. When it is desired to read out the document data from the image memory 4 according to user's designation, the system makes reference to these file headers and page headers. Further, when it is desired to read out a compressed image data corresponding to each page of each file from the image memory 4, the read-out data is decoded into a raw data through the image memory manager 5.

Referring to FIG. 3, in order to define destination names "A", "B", "C", "D", ..., destination numbers (facsimile numbers) for the destination names, and circular groups for circular transmission (to be explained later); group attribute flags indicative of 'presence or absence' of the associated group members are provided for the associated destination names and are stored as respective destination data in the destination data memory 15.

In the example of FIG. 3, the following contents are defined and registered.

The destination name "A" has its destination number "01-2345-6789" and belongs to its own circular group.

The destination name "B" has its destination number "01-3579-2468" and belongs to its own circular The destination name "C" has its destination number "03-4567-8901" and does not belong to its own circular group.

Figure 4:
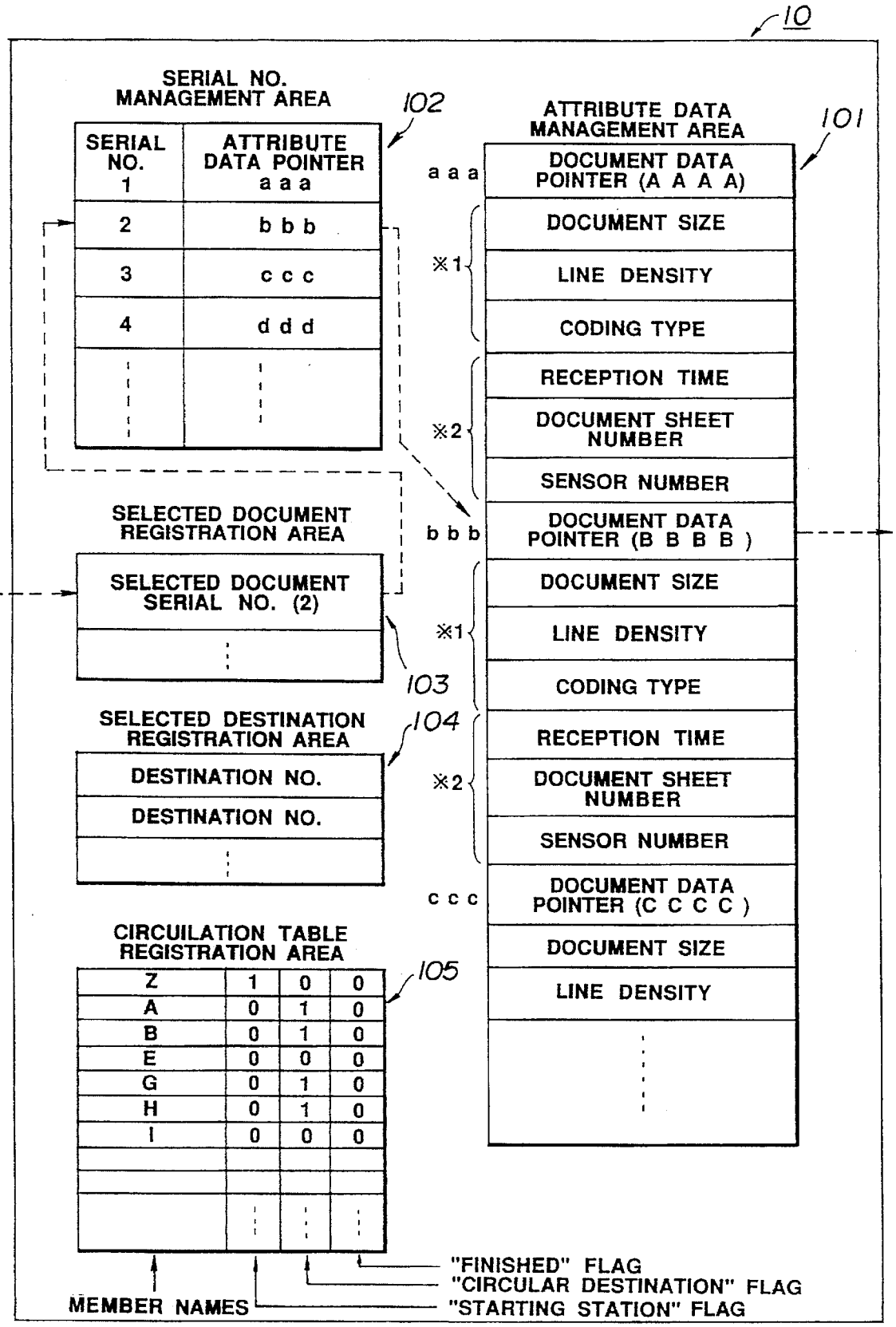
FIG. 4 is a diagram schematically illustrating an example of a structure of a management data memory in FIG. 1 wherein contents of various types of management data are registered.

Also shown in FIG. 4 is an example of the storage structure of the management data memory 10. In the management data memory 10, as shown in FIG. 4, an attribute data management area 101, a serial number (acceptation number) management area 102, a selected original registration area 103, a selected destination registration area 104 and a circulation table registration area 105 are provided and management data which will be described below are temporarily stored in these areas.

The attribute data management area 101 manages various sorts of attribute data in the document data stored in the image memory 4. Stored in the attribute data management area 101 are pointers indicative of heading addresses within the image memory 4, document sizes such as A4, B4 or A3, reading line densities, coding types such as MMR, signal reception times, the number of documents, and facsimile numbers of senders with respect to the respective document data.

In the present embodiment, a part indicated by a mark "x1" in FIG. 4 represents the signal reception specifications (quality) of these document data determined by the transmission ability of the sender and the reception ability of its own station. The signal reception specifications are also attribute data which determine the signal transmission specifications (quality) of the document data to another facsimile equipment to which the document data are to be sent in a memory transmitting operation (which will be explained later). A part indicated by a mark "x2" in FIG. 4 represents attribute data which are referred to and displayed to specify these document data in "document list display" (which will be explained later).

The serial number management area 102 manages the acceptation numbers of the document data stored in the image memory 4 in their acceptation order. Stored in the area 102 are pointers for the above attribute data of the corresponding document data, i.e., pointers indicative of the respective heading addresses in the above attribute data management area 101 with respect to the serial numbers "1", "2", "3", ... of these acceptation numbers. For this reason, in the facsimile equipment of the present embodiment, when one of the serial numbers (acceptation numbers) registered in the serial number management area 102 is specified, the attribute data of the corresponding document data is specified and thus the storage position of the data in the image memory 4 is also specified.

It is assumed that the registered contents of these attribute data management area 101 and serial number management area 102 are held until the corresponding document data are erased from the image memory 4, and when "erase command" (which will be explained later) causes the document data to be controllably erased, the corresponding registered contents are also erased from the areas 101 and 102.

The selected document registration area 103 temporarily registers therein the serial numbers (acceptation numbers) of the documents selected by the user in "document list display" (which will be described later). The selected destination registration area 104 temporarily registers therein the destination numbers of the destinations (to be facsimile transmitted) selected by the user in a destination list displaying operation (which will be described later) or ID data capable of specifying the destinations.

In these areas 103 and 104, the selected document data to be transmitted and the selected destinations to be transmitted are temporarily registered. When the corresponding memory transmitting operation is completed, the temporarily registered contents of these areas are also automatically erased. For example, if the document selected by the user in "document list display" (which will be explained later) has a serial number "2", then the number "2" is temporarily registered in the selected document registration area 103. Subsequently, as shown by broken-line arrows in FIG. 4:

The pointer "bbb" registered in the serial number "2" in the serial number management area 102 specifies the attribute data starting with the address "bbb" in the attribute data management area 101.

The attribute data starting with the address "bbb" in the attribute data management area 101 specifies the document data starting with the address "BBBB" in the image memory 4 (FIG. 2).

Further, the circulation table registration area 105 temporarily registers therein a circulation table data generated (when it is a circular starting station) or received (when it is a circular relay station) in a circular transmitting operation (which will be explained later). The circulation table data comprises, for example as shown in FIG. 4, "member names" (arranged in a predetermined circulation order) for a circular group, "starting station flag" for identifying the circular starting station, "circular destination flag" for identifying ones of the circular group members to be actually circulated, and "finished flag" for identifying ones of the circular destination members which are already circulated.

The main controller 3 can specify the destination to be next circulated and its destination number by matching the circulation table data registered in the circulation table registration area 105 with the previous destination data registered in the destination data memory 15.

Figure 5:
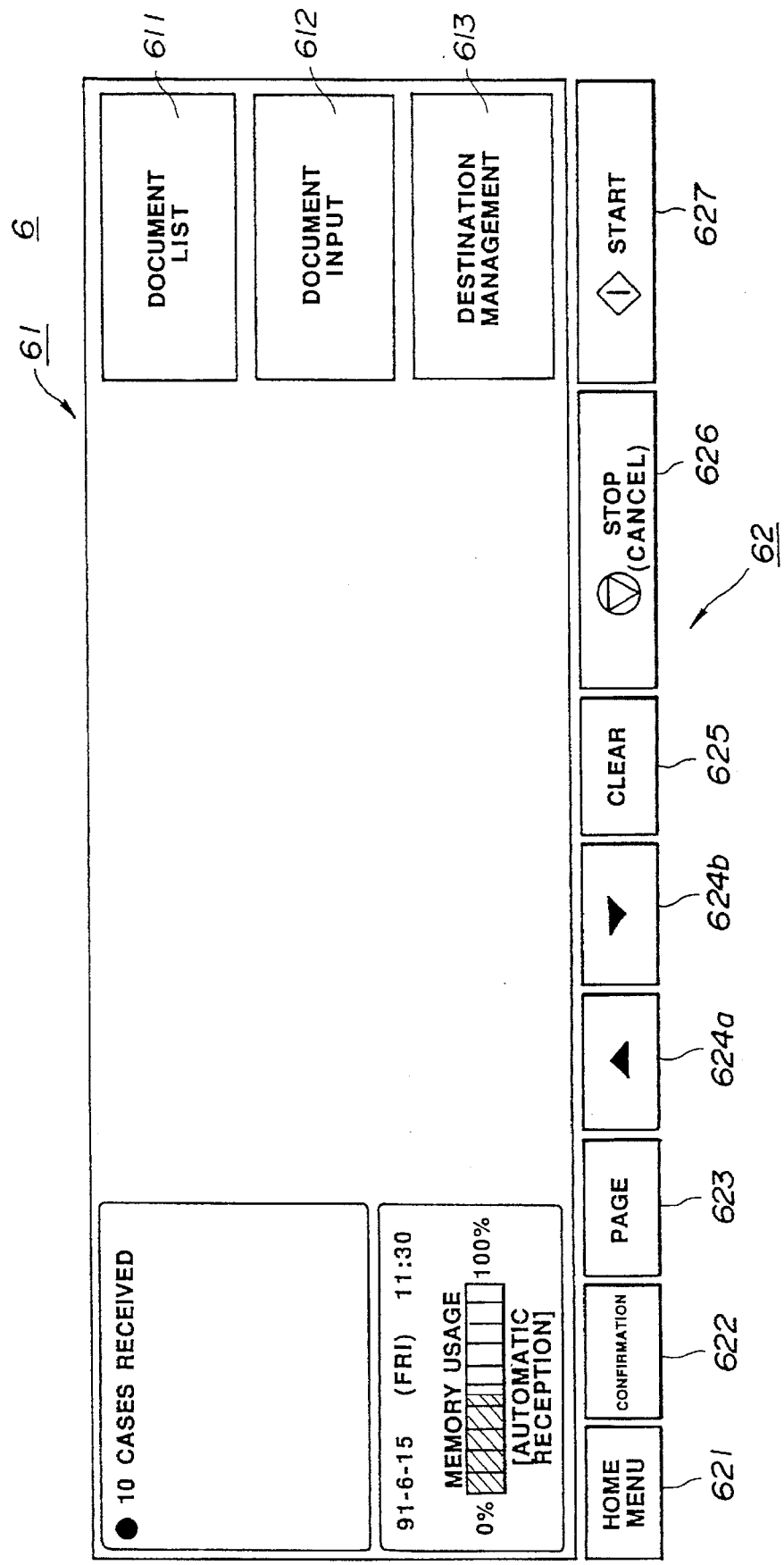
FIG. 5 illustrates an example of a display/input unit in FIG. 1.

FIG. 5 shows an example of the display/input unit 6. In FIG. 5, reference numeral 61 denotes a display part for visually displaying the image of a document data specified by the user, various sorts of "help" data, "document list" (which will be explained later), a destination list (which will be explained later), etc.; whereas, numeral 62 denotes an input part having various sorts of operating keys arranged thereon.

In the illustrated example, the display part 61 has an input function through a touch sensor panel. For example, in FIG. 5, when the user presses a region 611 indicated by "DOCUMENT LIST", "document list display command" is inputted; when the user presses a region 612 indicated by "DOCUMENT INPUT", "document input start command" is inputted; and when the user presses a region 613 indicated by "DESTINATION MANAGEMENT", "destination data management display command" for causing the aforementioned destination data to be registered in the destination data memory 15 or to be deleted from the memory 15 is inputted. Like a command inputted through the input part 62, a command inputted through the touch sensor panel is also interpreted through the input/output controller 9 and the interpreted command contents is transmitted to the main controller 3.

Of the operating keys arranged in the input part 62, a key 621 is a home menu key which is used to command the facsimile equipment to display a function menu of various types of executable functions on the display part 61 in the initial state of the facsimile equipment of the embodiment, a key 622 is a confirmation key which is used to input the contents of one of the functions or one of the received data selected by the user in the home menu or in the received data list, a key 623 is a page key which is used to command the facsimile equipment to change the page of the document image displayed on the display part 61, keys 624a and 624b are cursor keys which are used to scroll the document image displayed on the display part 61 or to execute the selected data in the home menu or the received data list displayed on the display part 61, a key 625 is a clear key which is used to erase the selected specific received document data from the image memory 4, a key 626 is a stop key which is used to release (cancel) commands inputted through the above various keys or to give an emergent stop to the facsimile transmission, and a key 627 is a start key which is used to start the facsimile transmission including the memory transmission and circular transmission to be explained later. Of the elements of the facsimile equipment of FIG. 1, the printer 11, print controller 12, scanner 13 and read controller 14 are already well known in their structure, function and operation and thus explanation thereof is omitted.

Detailed explanation will be made as to the memory transmitting and circular transmitting operations of the facsimile equipment of the present embodiment of FIG. 1 by referring to FIGS. 6 to 16.

Explanation will first be made as to the usual signal receiving operation.

Figure 6:
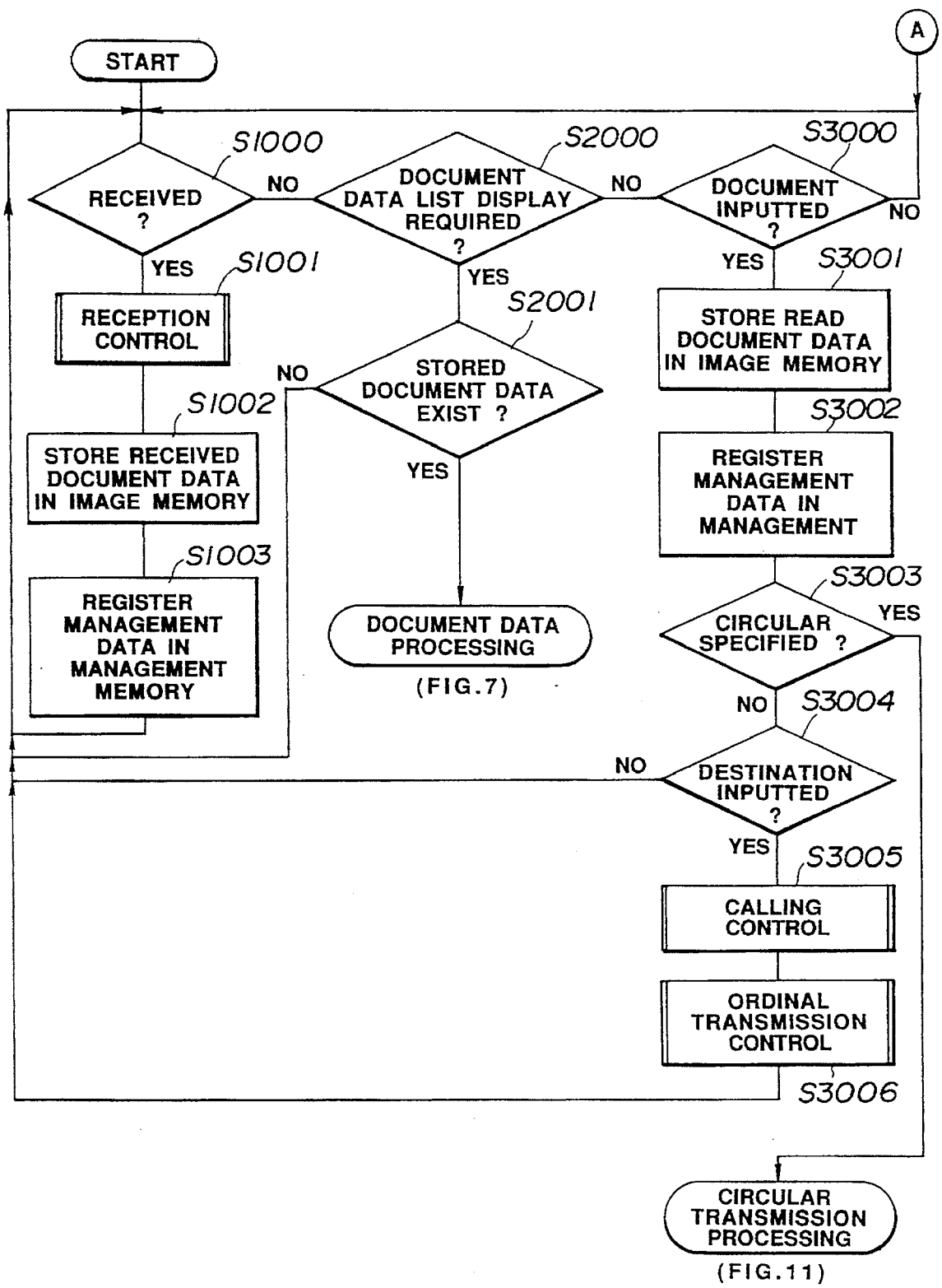
FIG. 6 is a flowchart illustrating an example of the operations in the facsimile equipment of the present embodiment starting with its initial state.

Assume now that the facsimile equipment of the present embodiment receives a document data from another facsimile equipment (not shown) connected thereto through the telephone line NW (step S1000 in FIG. 6). Then the document data is sent to the NCU 1 of the facsimile equipment (step S1001 in FIG. 6).

The received document data is demodulated and decoded through the modem 2, subjected at the image memory manager 5 to a re-encoding operation based on the aforementioned MMR or the like, and then written in the image memory 4 together with data indicative of different files and pages in a format as shown in FIG. 2 (step S1002 in FIG. 6). Attribute data and management data such as serial number (acceptation number) regarding the document data are separately registered in the management data memory in such a format as shown in FIG. 4 (step S1002 in FIG. 6).

In the embodiment, when the document data is stored in the image memory 4 and its management data is registered in the management data memory 10 in this way, the then storage state of the document data and the reception data are transmitted through the main controller 3 to the input/output controller 9 so that the document data storage state and the reception data are displayed on part of the display part 61 through the input/output controller 9, e.g., in such a manner as shown in FIG. 5. In this connection, the "help" display may be the acceptation number of the received document data and a list of facsimile numbers or ID data for the destinations (to be transmitted).

Explanation will next be made as to the operation of the facsimile equipment when a command for demanding the display of a list of the thus-stored document data is issued.

Assuming that the user presses the region 611 "DOCUMENT LIST" in the display part 61 of FIG. 5 to issue "document list display command" (step S2000 in FIG. 6), then control moves to "document data processing" if the document data is stored in the image memory 4 (step S2001 in FIG. 6).

Figure 7A:
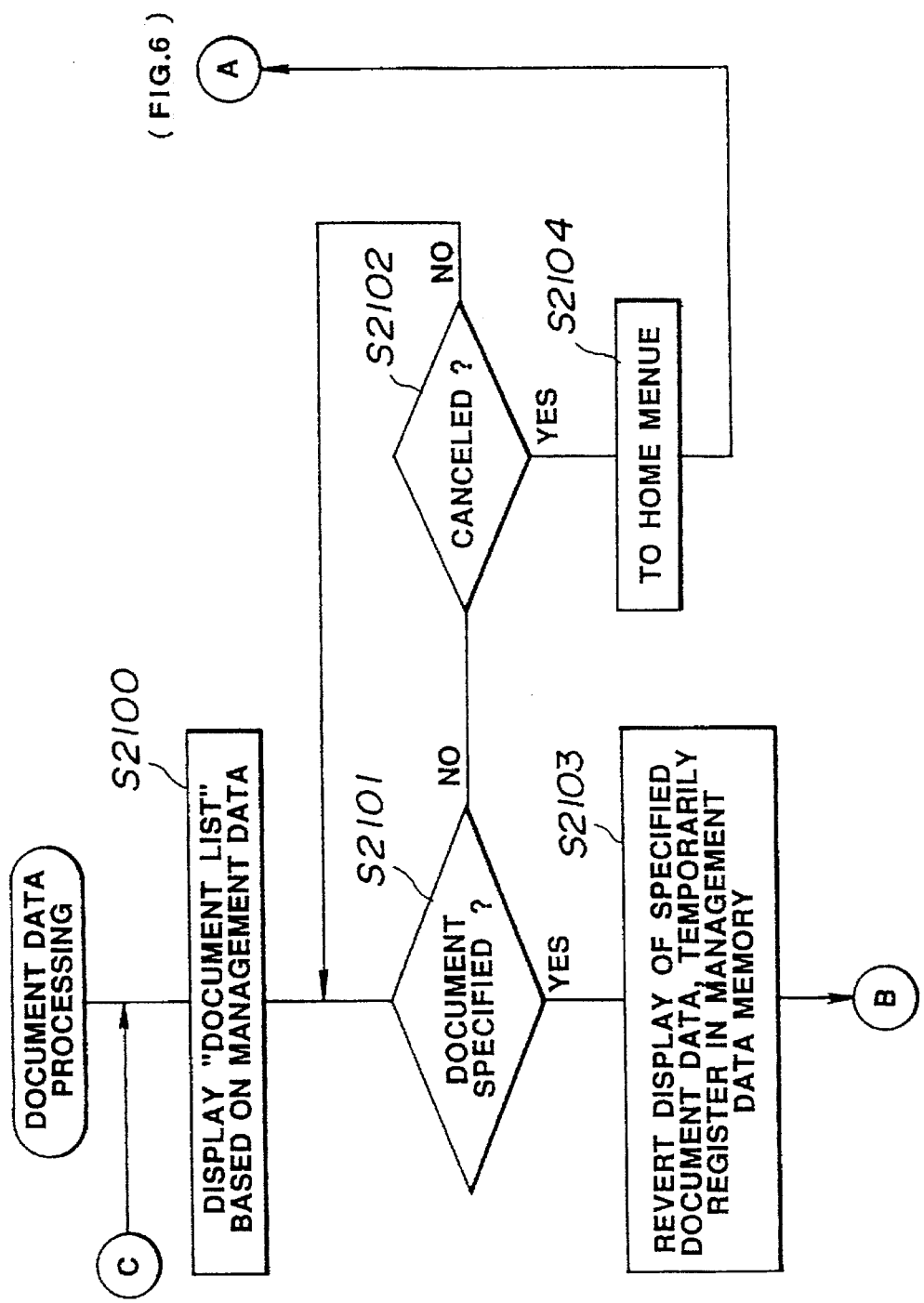
FIG. 7 is a flowchart illustrating an example of operations of the facsimile equipment of this embodiment in "document data processing"
Figure 7B:
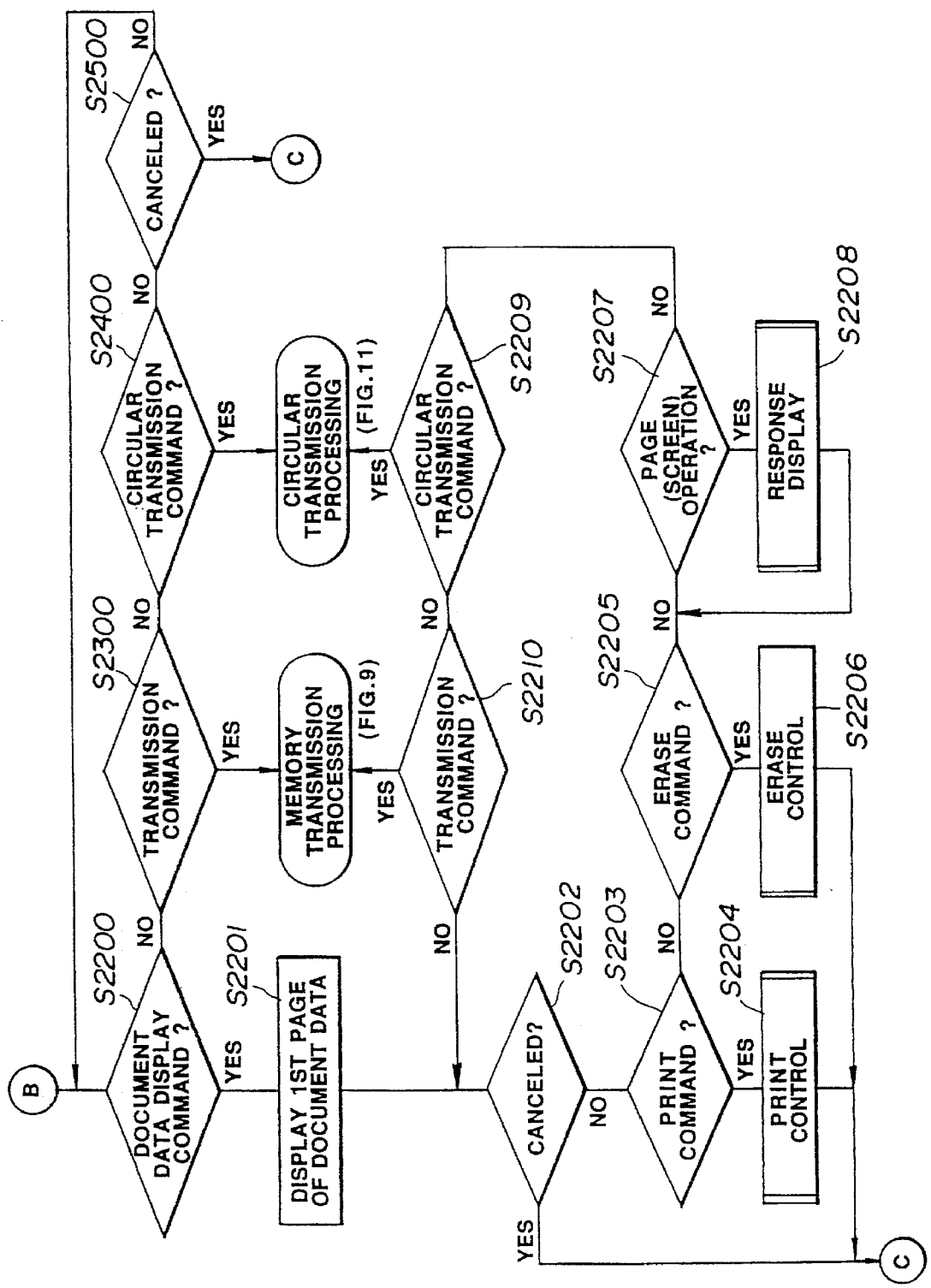
Figure 8:
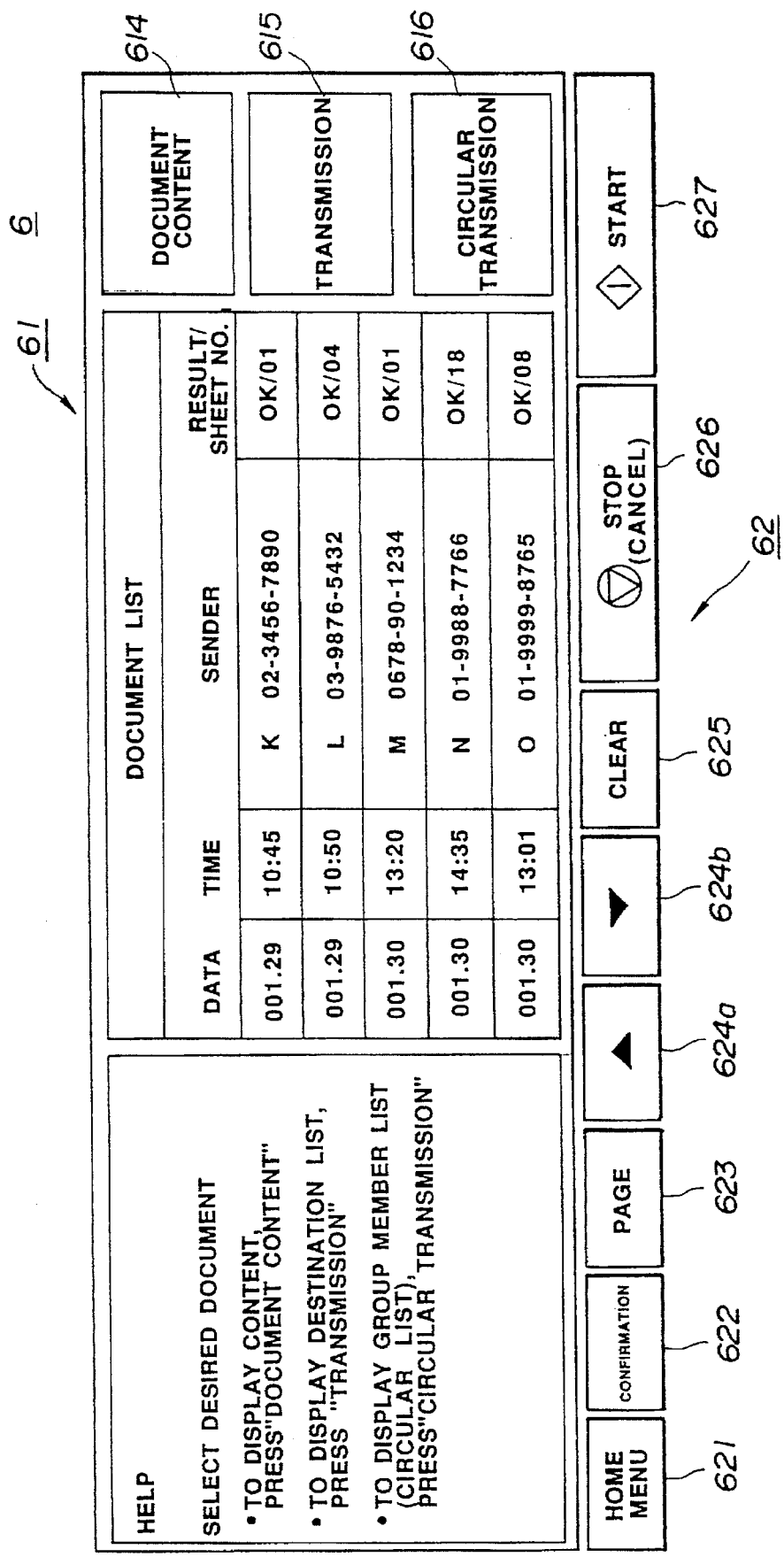
FIG. 8 illustrates an example of "document list" on the screen of the display/input unit in "document data processing"

In "document data processing", first, a list of the stored documents based on the above management data (refer to the mark "x2" in FIG. 4) is displayed on the display part 61 in such a manner as shown, e.g., in FIG. 8 (step S2100 in FIG. 7).

When the user presses the corresponding region of the display part 61 provided with the touch sensor panel to specify desired one of the documents in the displayed list (step S2101 in FIG. 7), the main controller 3 recognizes user's instruction, reverts the display of the data part of the specified document to provide visual distinction through the input/output controller 9, and registers the serial number (acceptance number) of the specified document in the selected document registration area 103 of the management data memory 10 (step S2103 in FIG. 7).

If it is impossible to display all the stored document data on the document list screen (refer to FIG. 8), the screen may be scrolled through the cursor keys 624a or 624b, or not only a single document but also a plurality of documents may be specified through user's repetitive pressing on the list screen. In this case, if the user cancels it (that is, presses the stop key 626) without specification of any documents (step S2102 in FIG. 7, then control goes to the home menu screen (as in FIG. 5) (step S2104 in FIG. 7).

When the user specify a document and then cancel it (step S2500 in FIG. 7), the reverted display is cleared and the serial number registered in the selected document registration area 103 are also cleared. As a result, the screen is returned to the previous document list screen (step S2100 in FIG. 7).

When the home menu key 621 of the input part 62 is depressed, the facsimile equipment is returned to the initial home menu display state regardless of the situations. This is applied to and subsequent descriptions.

In the facsimile equipment of the embodiment, after the document is specified in this way, when the user presses input regions 614, 615 and 616, the specified document can be put in "document contents displaying processing", memory transmitting operation and circular transmitting operation respectively, as shown in FIG. 8.

More specifically, when the user presses the input region 614 to command "document contents displaying processing" (step S2200 in FIG. 7), the main controller 3 recognizes user's command, reads out from the image memory 4 the first page of the corresponding document data through the image memory manager 5 on the basis of the above registration data to the management data memory 10, and writes the read-out data in the video buffer 7 through the input/output controller 9 and the write controller 8 to visually display its contents on the display part 61 (step S2201 in FIG. 7). Under such a condition, similarly to the above, user's pressing of the input regions to be displayed on the corresponding regions of the display part 61 or user's key pressing in the input part 62 enables "printing processing", "erasing processing", page (screen) operation, circular transmitting operation and memory transmitting operation of the corresponding display document.

When the user issues a print command (step S2203 in FIG. 7), the print control of the corresponding document is effected through the printer 11 and the print controller 12 (step S2204 in FIG. 7). Issuance of "erase command" (step S2205 in FIG. 7) causes the corresponding document to be controllably erased from the image memory 4 and the management data memory 10 (step S2206 in FIG. 7). When the page operation is carried out over the displayed contents of the document (step S2207 in FIG. 7), rewriting operation of the video buffer 7 is carried out to respond to the operation contents through the input/output controller 9 and the write controller 8 (step S2208 in FIG. 7).

Even in this case, when canceling operation (depression of the stop key 626) is carried out (step S2202 in FIG. 7), the displayed contents of the document are cleared and the serial number registered in the above selected document registration area 103 is also cleared, so that the facsimile equipment returns to the previous document list screen (step S2100 in FIG. 7).

Figure 9:
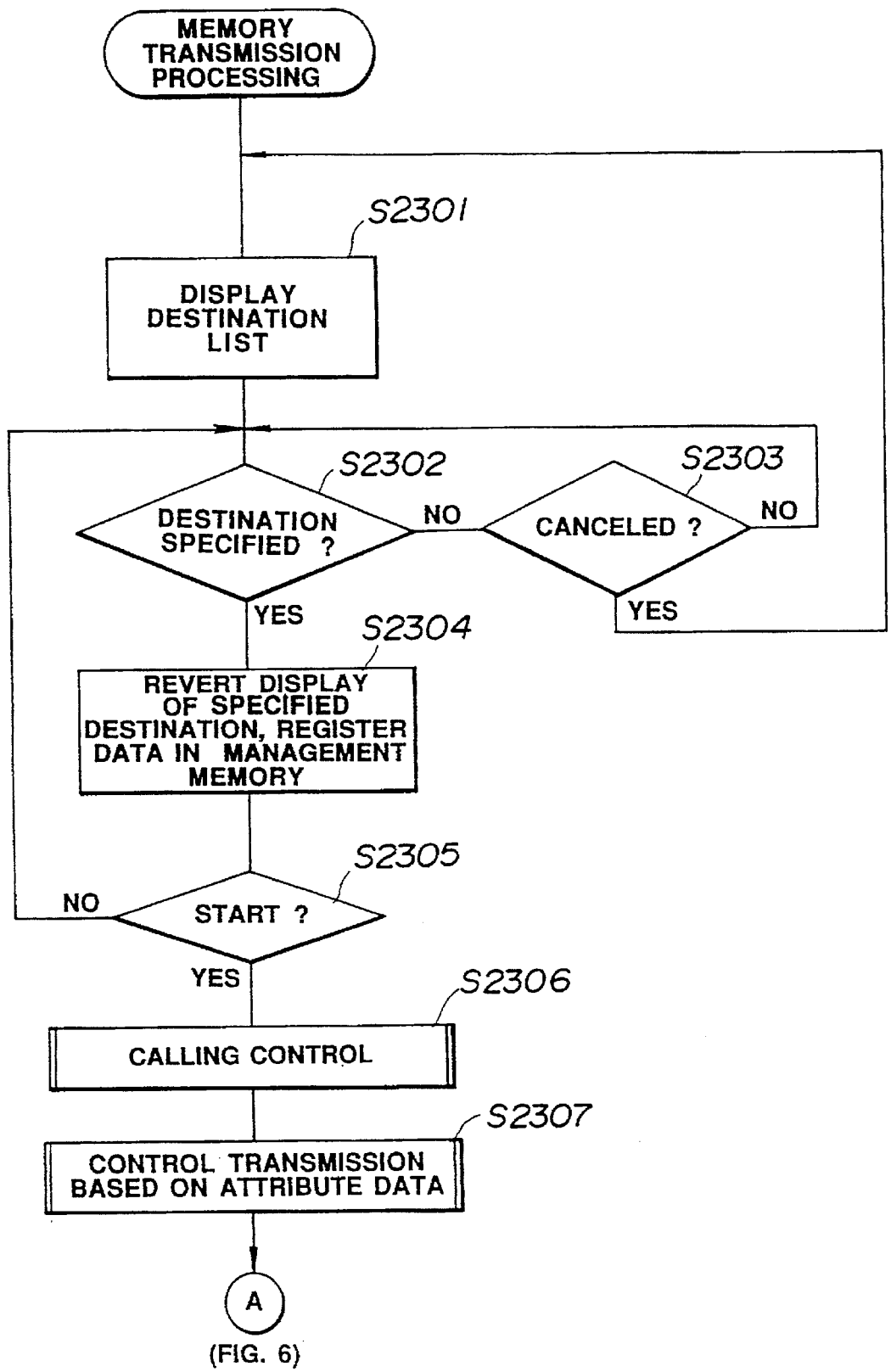
FIG. 9 is a flowchart illustrating an example of operations of the facsimile equipment of the embodiment in "memory transmission processing"
Figure 10:
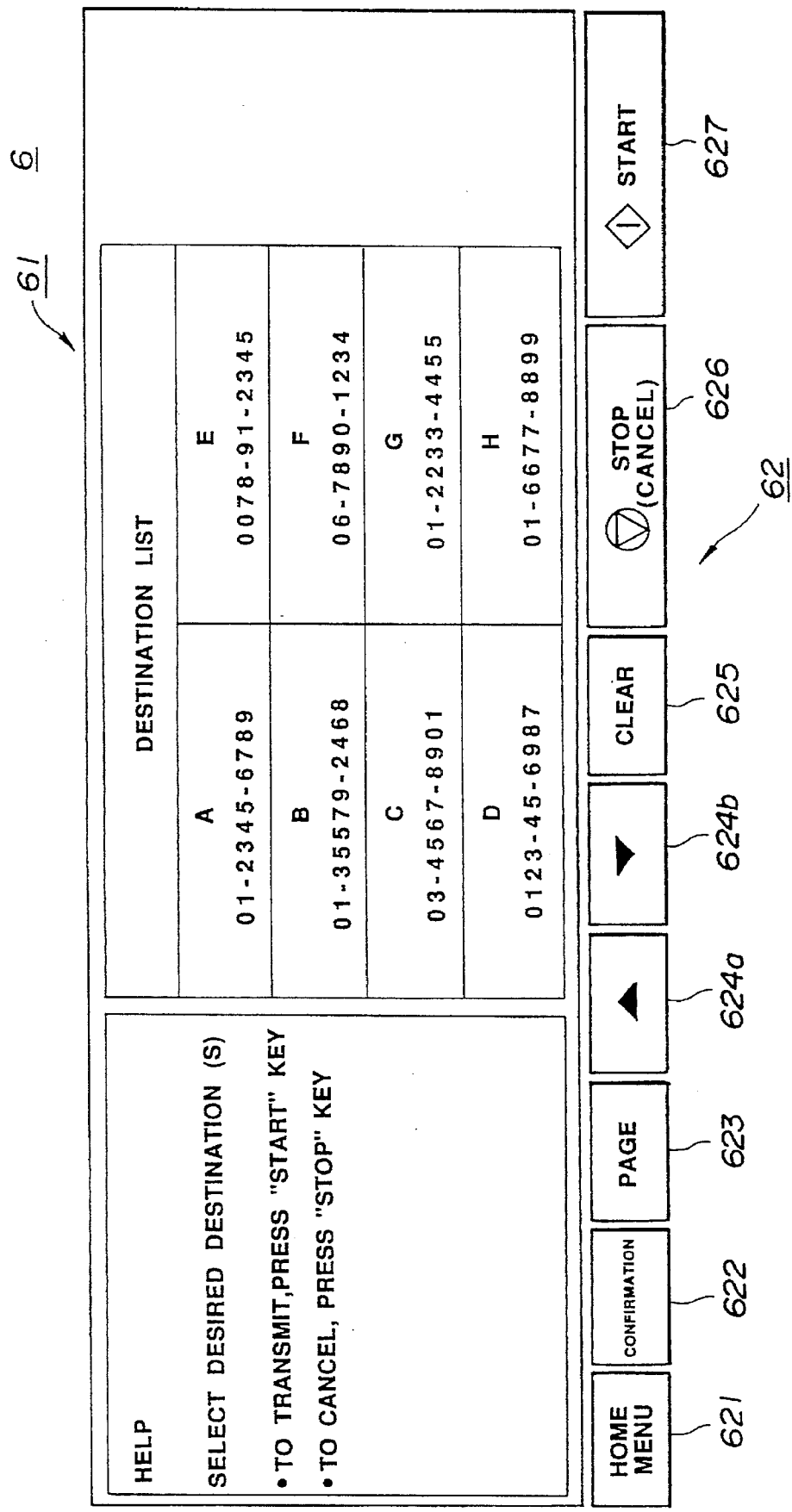
FIG. 10 illustrates an example of a destination list on the screen of the display/input unit in "memory transmission processing"

When the user issues a transmission command (step S2300 in FIG. 7 or step S2210 in FIG. 7) in such a condition that the specification of the above document is made (step S2103 in FIG. 7) or that the contents of the specified document is displayed (step S2201 in FIG. 7), a destination list screen as shown in FIG. 10 appears on the display part 61 and the facsimile equipment is shifted to the memory transmitting operation (FIG. 9).

In "memory transmission processing", when the user directly presses the corresponding region of the display part 61 provided with the touch sensor panel to specify desired one of the destinations in the displayed list (step S2302 in FIG. 9) in the above destination list display state (step S2301 in FIG. 9), the main controller 3 recognizes the user's specification, reverts the display of the specified destination through the input/output controller 9 to provide visual distinction thereto, and registers the destination number (or its ID data) of the specified destination in the selected destination registration area 104 of the management data memory 10 (step S2304 in FIG. 9).

Even in the case where it is impossible to display all the data of the stored document data on the destination list screen (refer to FIG. 10), the user can scroll the screen through the cursor key 624a or 624b or not only a single destination but also a plurality of destinations can be specified through user's repetitive pressing even on the destination list screen (step S2302 )( step S2304 in FIG. 9). Even in this case, when the above destination specification is carried out and then canceling operation (depression of the stop key 626) is carried out (step S2303 in FIG. 9), the above reverted display is cleared and the number registered in the selected destination registration area 103 is also cleared, so that the facsimile equipment returns to the previous destination list screen (step S2301 in FIG. 9).

In the facsimile equipment of the present embodiment, when the destination is specified and then the start key 627 of the input part 62 is operated in this way (step S2305 in FIG. 9), the destination number registered in the selected destination registration area 104 of the management data memory 10 is read out through the main controller 3, that is, calling control based on so-called auto-dialling is started (step S2306 in FIG. 9). That is, the read-out destination number is transferred through the modem 2 to the NCU 1 so that the corresponding destination facsimile equipment is called through the NCU 1.

When the facsimile equipment is normally connected to the destination facsimile equipment through the above calling operation, the previously specified document data, i.e., the document data registered as a serial number in the selected document registration area 103 of the management data memory 10 is read out from the image memory 4 on the basis of the registration number as mentioned above, the transmission specifications of the document data with respect to the connected destination facsimile equipment are determined on the basis of the attribute data (indicated by the mark "x1" in FIG. 4) associated with the reception specifications of the document data, and the transmission control of the document data through the modem 2 and the NCU 1 is started with the determined specifications (document size, line density, encoding type, etc.) (step S2307 in FIG. 9).

In the above-described manner, the facsimile equipment of the present embodiment can transmit desired one of the received document data stored in the image memory 4 through the image memory 4 directly to another facsimile equipment. When the user issues a circular transmission command (step S2400 in FIG. 7 or step S2209 in FIG. 7) in such a condition that the specification of the above document is made (step S2103 in FIG. 7) or that the contents of the specified document is displayed (step S2201 in FIG. 7), a group member list screen as shown in FIG. 12 appears on the display part 61 and the facsimile equipment is shifted to the circular transmitting operation (FIG. 11).

Figure 11:
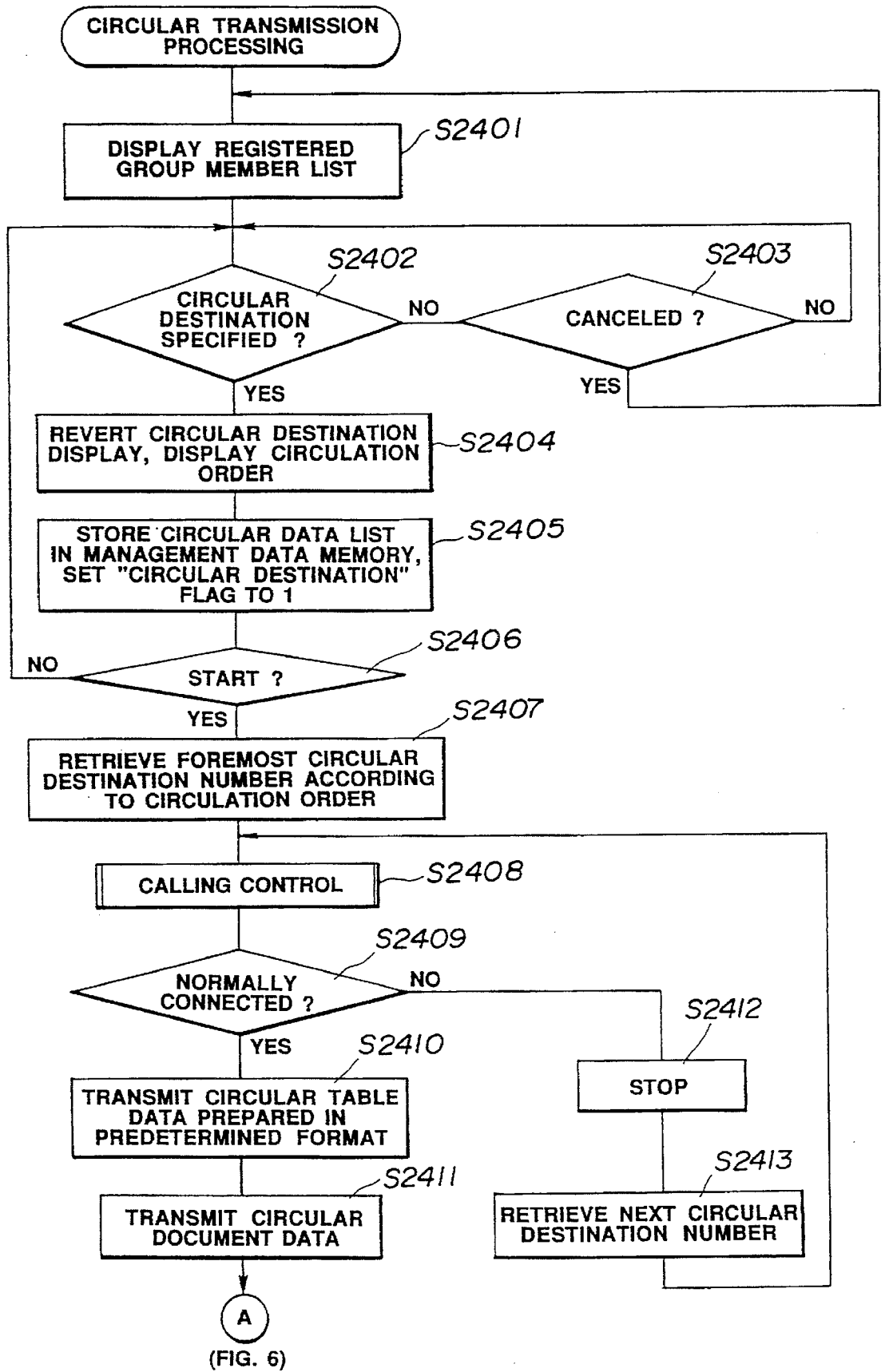
FIG. 11 is a flowchart illustrating an example of operations of the facsimile equipment of this embodiment in "circular transmission processing"
Figure 12:
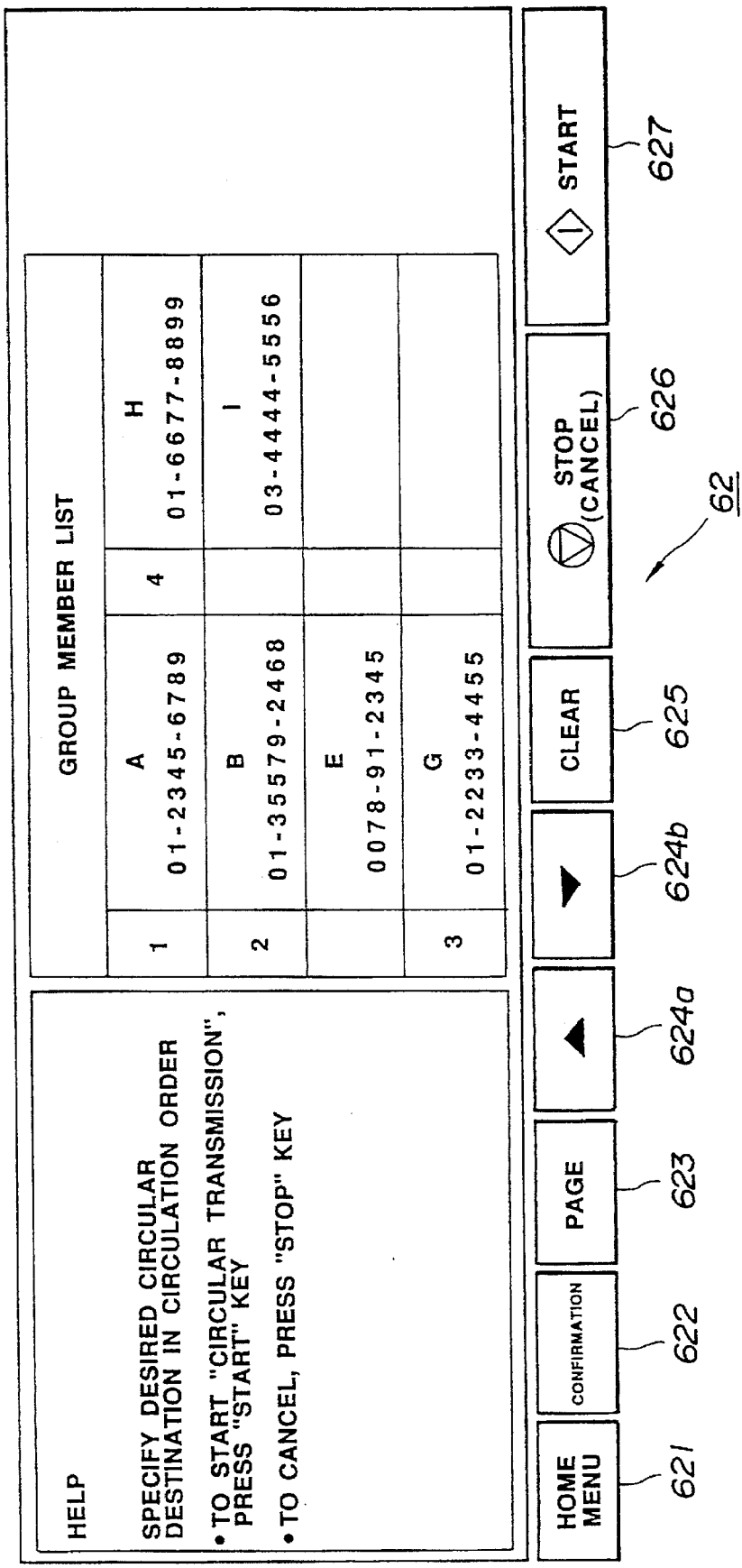
FIG. 12 illustrates an example of a group member list on the screen of the display/input unit in "circular transmission processing"

In "circular transmission processing", in more detail, the user directly presses the corresponding region of the display part 61 provided with the touch sensor panel to sequentially specify desired ones of the members in the displayed list in its circulation order (step S2402 in FIG. 11) in the above group member list display state (step S2401 in FIG. 11).

When the specifying operation of the circular destinations is carried out in this way, the main controller 3 recognizes the specified circular destination members, reverts the display of the specified destination members through the input/output controller 9 to provide visual distinction thereto, and displays a number data indicative of the circulation order (the specified order in this example) in the corresponding region (step S2404 in FIG. 11).

The main controller 3, in addition to the above operation, further creates the aforementioned circulation table data having its own station (station Z in this example) as a circular starting station in the circulation table registration area 105 (FIG. 4) of the management data memory 10, and sets "circular destination flag" of the specified circular destination members at "1" (step S2405 in FIG. 11).

The above operation of the main controller 3 is repeated until the above circular destination specifying operation by the user is completed, that is, until canceling operation is carried out (step S2403 in FIG. 11) or the start key 627 is operated (step S2406 in FIG. 11). When the canceling operation (depression of the stop key 626) is carried out, the above reverted display and the number data indication are cleared through the main controller 3 and the circulation table data created and registered in the above circulation table registration area 105 is also cleared, so that the facsimile equipment returns to the previous group member list screen (step S2401 in FIG. 11). In the illustrated example, as exemplified in FIG. 12, members A, B, G and H of the group members A, B, E, G, H and I displayed in the list are specified as circular destinations in this order and the start key 627 is operated. In this case, the created circulation table data is also as exemplified in FIG. 4.

When the start key 627 of the input part 62 is operated in this way (step S2406 in FIG. 11), the facsimile equipment of the present embodiment, under control of the main controller 3, compares the circulation table data created and registered in the management data memory 10 with the destination data registered in the destination data memory 15, retrieves the destination number of foremost circular destination member on the basis of the comparison result and according to the circulation order of the set circular destination members (step S2407 in FIG. 11), and temporarily registers the retrieved destination number in the selected destination registration area 104 of the management data memory 10 to start the calling control based on the auto-dial in substantially the same manner as mentioned above on the basis of the temporarily registered destination number (step S2408 in FIG. 11).

As a result, if the facsimile equipment is normally connected to the facsimile equipment of the circular destination (step S2409 in FIG. 11), then the main controller 3 transmits, prior to the transmission of the previously specified document data or the circular document data, the above created circulation table data to the circular destination member now being connected (step S2410 in FIG. 11) and thereafter transmits the circular document data to the circular destination member (step S2411 in FIG. 11).

During the aforementioned calling control, if an accident or some reason in use results in a failure of the normal line connection with the foremost circular destination member of the above circulation order (step S2409 in FIG. 11), then the facsimile equipment once stops the calling (step S2412 in FIG. 11), retrieves the destination number of the member specified as the next circular destination (step S2413 in FIG. 11), and repeats the calling control based on the retrieved destination number (step S2408 in FIG. 11).

When "circular transmission processing" is specified in this way, two sorts of data, i.e., the above circulation table data and the circular document data are transmitted to the specified member of the circular destination. In other words, the facsimile equipment as the circular destination can know whether or not the received document corresponds to the circular document by judging the attachment or non-attachment of the above circulation table data to the received data.

Figure 13A:
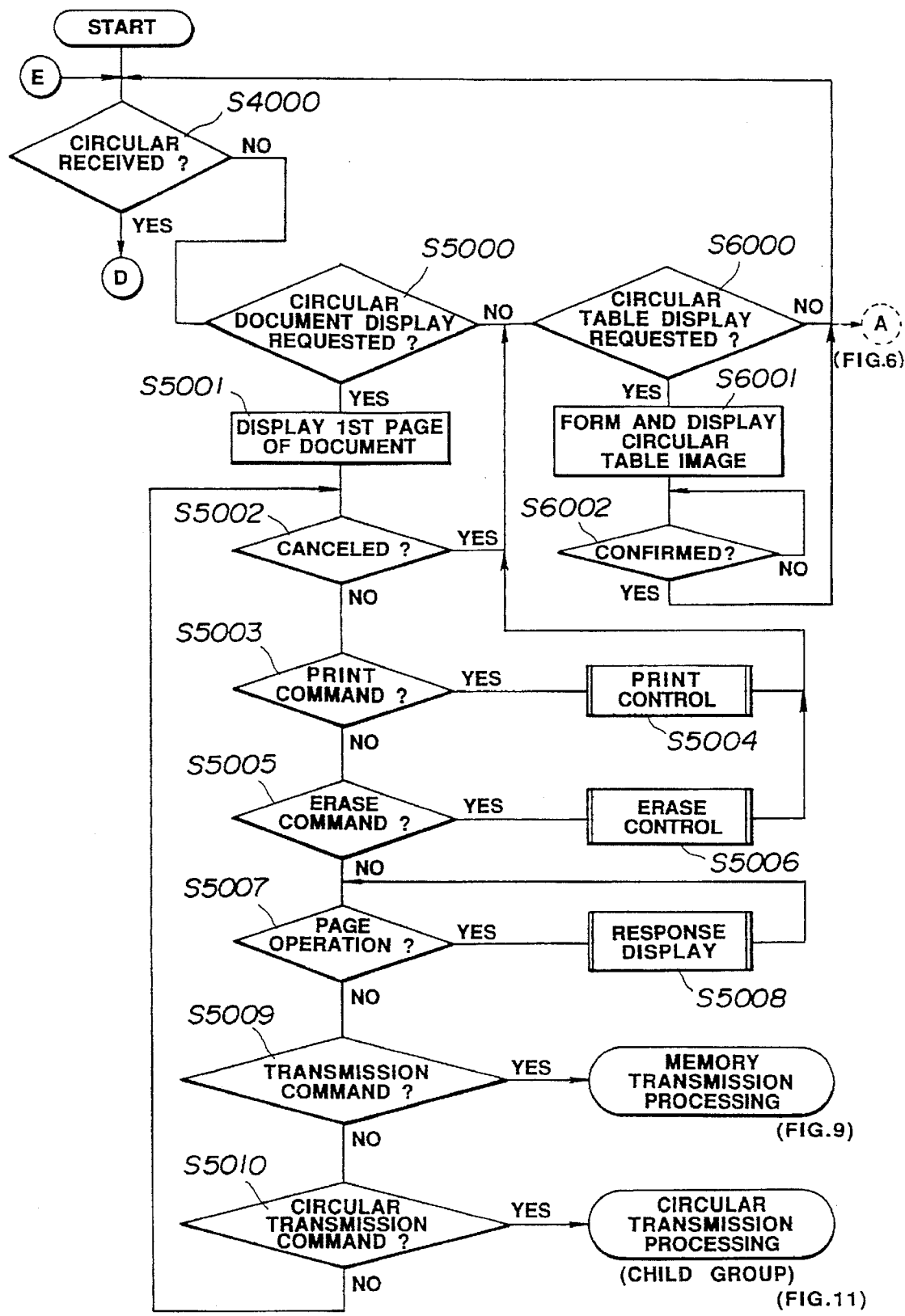
FIG. 13 is a flowchart illustrating an example of operations in "circular processing" when the facsimile equipment of this embodiment serves as a circular relay station.
Figure 13B:
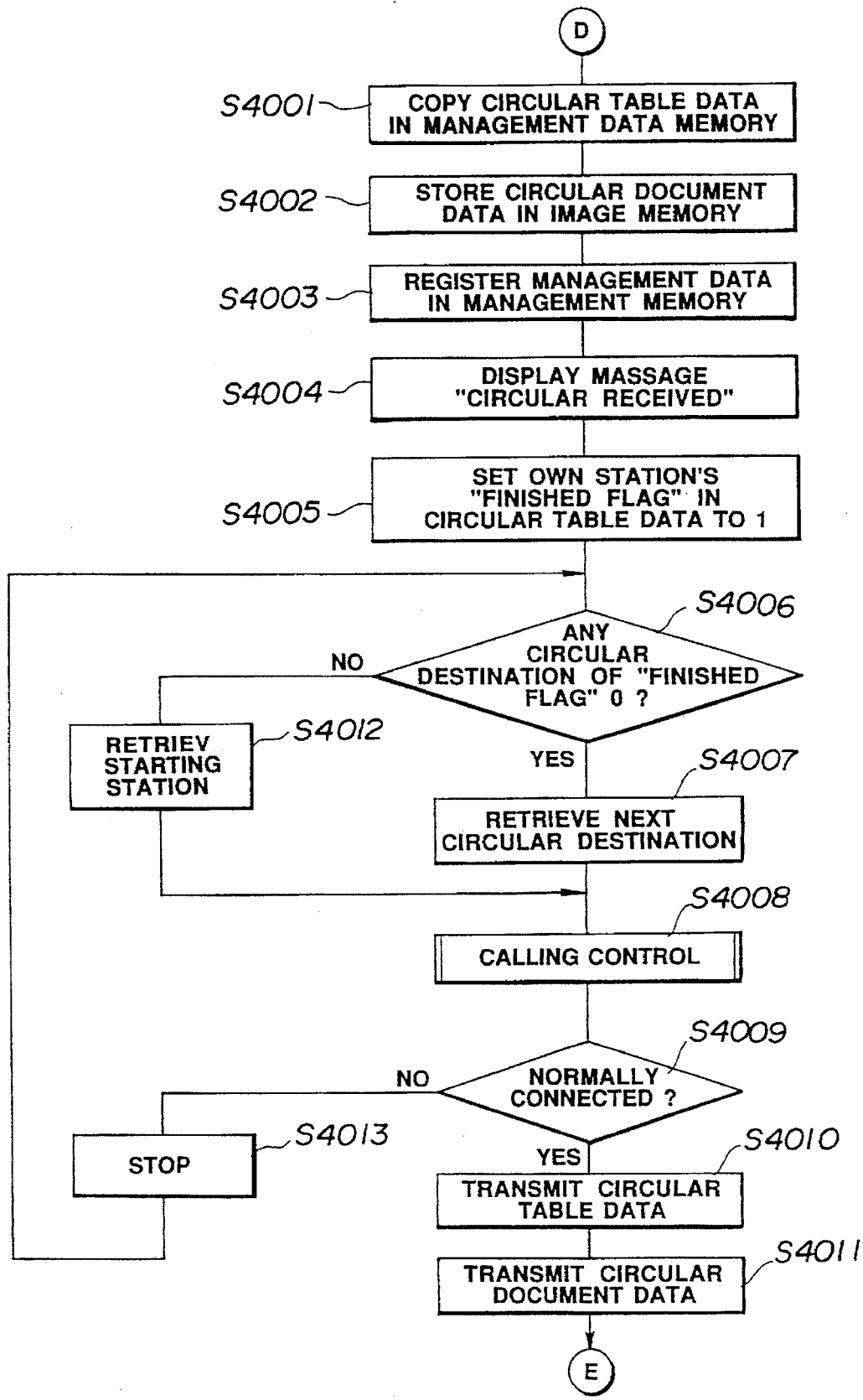

FIG. 13 shows an example of the document circulating operation executed in the circular destination facsimile equipment or circular relay station. The circular document processing operation of the circular relay station will be detailed by referring to FIG. 13. Even the circular relay station has substantially the same arrangement as the facsimile equipment of FIGS. 1 to 5.

Assume that the own station (circular relay station) receives the circular document data having the above circulation table data attached thereto (step S4000 in FIG. 13). Then the facsimile equipment (more precisely, the main controller 3) as the circular relay station processes these circulation table data and circular document data according to a predetermined procedure and in such a manner as will be described below.

(1) Of the received circulation table data and the circular document data, one circulation table data is copied in the circulation table registration area 105 of the management data memory 10 (step S4001 in FIG. 13); while the other circular document data is once demodulated (decoded) through the modem 2, subjected at the image memory manager 5 to a suitable re-encoding operation, and then stored in the image memory together with data indicative of different files and different pages in a format as shown in FIG. 2 in substantially the same manner as mentioned above (step S4002 in FIG.

Figure 14:
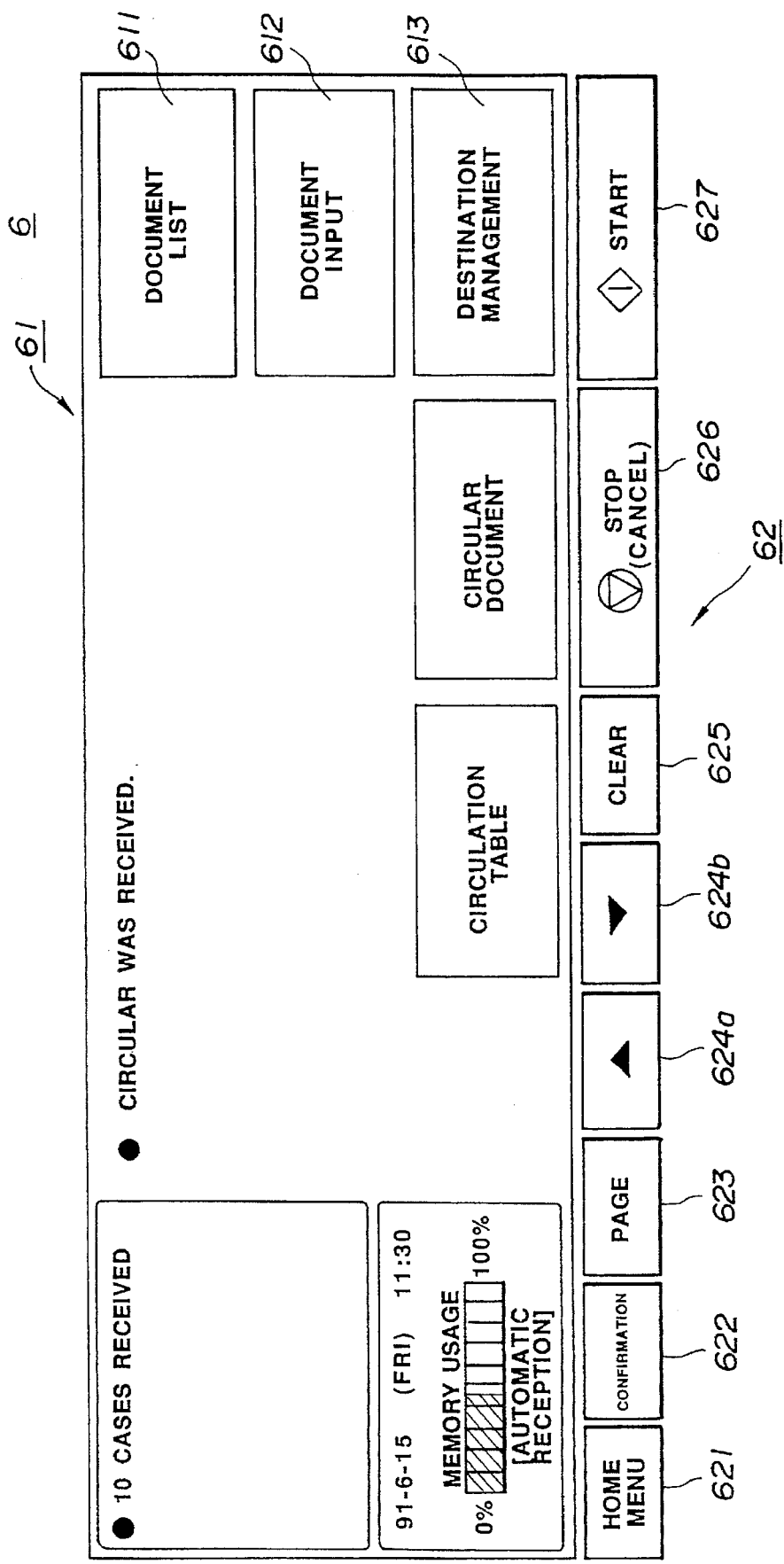
FIG. 14 is an example of the screen of the display/input unit in "circular processing" when the facsimile equipment of this embodiment serves as a circular relay station and receives a circular.

(2) Next, management data such as attribute data and serial number (acceptation number) on the circular document data stored in the image memory 4 are separately registered in the management data memory 10 in a format as shown in FIG. 13 in substantially the same manner as mentioned above (step S4003 in FIG. 13), a previously prepared message data indicative of the presence of a circular is written in the video buffer 7 through the-input/output controller the input/output controller 9 and the write controller 8, and the message data is displayed on the display part 61 in a format as shown in FIG. 14 (step S4004 in FIG. 13). At the time of receiving the circular document data, the serial number (acceptation number) of the circular document data is automatically registered in the selected document registration area 103 of the management data memory 10.

(3) After the registration of the respective management data is completed in this way, the finished flag of its own station to which the circulation table data copied in the management data memory 10 is circulated is updated to indicate the finished circulation to its own station in the circulation table data (step S4005 in FIG. 13).

(4) After the circulation table data is updated in this way, if one of the members specified as the circular destinations which has a finished flag of "0" is present, that is, if a member not circulated yet is present (step S4006 in FIG. 13), then the circular destination member specified next to its own station in the circulation order and its destination number are retrieved on the basis of the comparison result between the circulation table data and the destination data registered in the destination data memory 15 (step S4007 in FIG. 13), and substantially the same calling control as mentioned above is automatically started on the basis of the retrieved destination number (step S4008 in FIG. 13). In the illustrated example, it is assumed that data registration in the destination data memory 15 in a format as exemplified in FIG. 3 is previously already carried out over all the members belonging to at least the circular group.

(5) As a result of this calling, if normal interconnection is attained with the circular destination member (step S4009 in FIG. 13), then the own station transmits, prior to the transmission of the circular document data, the above updated circulation table data to the connected circular destination member (step S4010 in FIG. 13) and thereafter transmits the above management data (more precisely, the circular document data specified by the serial number automatically registered in the selected document registration area 103) to the circular destination member (step S4011 in FIG. 13).

(6) In the above processing (4), when anyone of the members specified as the circular destinations having the finished flag of "0" is not present, that is, when its own station is the last circular destination (step S4006 in FIG. 13), the starting station of the circular is retrieved as its call receiver on the basis of the comparison between the above circulation table data and the destination data registered in the destination data memory 15 (step S4012 in FIG. 13), the retrieved circular starting station is called, and the above circulation table data and the circular document data are transmitted (returned) to the circular starting station. As a result, the circular starting station can quickly confirm that the circular document has been circulated to or received by all the members specified as the circular destinations and that the contents of the circular document has been transmitted to all the members without being destroyed on the way.

(7) In the above processing (5), when an accident or some reason in use results in a failure of the normal interconnection with the member retrieved as the next circular destination (step S4009 in FIG. 13), the calling is once stopped (step S4013 in FIG. 13). When at least one of the members specified as the circular destinations having the finished flag "0" is present (step S4006 in FIG. 13), the destination number of the member specified as the next circular destination is retrieved (step S4007 in FIG. 13) and the calling control based on the retrieved destination number is repeated similarly to the above (step S4008 in FIG. 13).

When the repetitive processing by the full cycle of the members not circulated yet results in that all the not-circulated members all have the finished flag "1", that is, even when circular member or members are actually present but all the members fail to attain their normal interconnection due to an accident or some reason in use, the circular starting station is retrieved as its call receiver on the basis of the comparison between the above circulation table data and the destination data registered in the destination data memory 15 (step S4012 in FIG. 13), the retrieved circular starting station is called, and the above circulation table data and the circular document data are transmitted (returned) to the circular starting station, as in the above processing (6). In this case, the circular starting station can quickly confirm that the circular document has not been circulated to (received at) all the members specified as the circular destinations and also can quickly confirm ones of the members which are not circulated. Thus, its measure can be easily taken.

Through the aforementioned document circulating operation of the circular relay station, the circular document is quickly automatically circulated, the contents of the document is stored in the respective image memories 4 of the circular relay stations, and the circular document is put in its automatic selected state. The user at the circular relay station which has been circulated, can know by such a message as exemplified in FIG. 14 the fact that the document circulation of its own station has been completed.

When the user of the circulation-finished station presses the input region 617 of the display part 61 of FIG. 14 to issue a command "CIRCULAR Document CONTENTS DISPLAY" (STEP S5000 IN FIG. 13), the main controller 3 of the associated station recognizes the command, reads out from the image memory 4 the first page of the circular document data through the image memory manager 5, and writes the read-out data in the video buffer 7 through the input/output controller 9 and the write controller 8 to visually display its contents on the display part 61 (step S5001 in FIG. 13). As shown in FIG. 13, as when the user enters a command for display of the previously designated document contents even under such a condition, user's pressing of the input region displayed on the display part 61 or user's pressing of the input part 62 enables realization of "printing processing", "erasing processing", page (screen) operation, memory transmitting operation and circular transmitting operation of the associated circular document. When the user issues a print command (step S5003 in FIG. 13), this causes the printing control of the associated circular document to be executed through the printer 11 and the print controller 12 (step S5004 in FIG. 13). Issuance of "erase command" (step S5005 in FIG. 13) causes execution of erasing control of the image memory 4 and management data memory 10 with respect to the circular document (step S5006 in FIG. 13). Page operation of the display screen of the circular document contents (step S5007 in FIG. 13) causes the input/output controller 9 and write controller 8 to rewrite the video buffer 7 to respond to its operation contents (step S5008 in FIG. 13). And when canceling operation is now carried out (when the stop key 626 is pressed) (step S5002 in FIG. 13), the display of the document contents is cleared and the display is returned to the message display screen of FIG. 14 or to the home menu display screen of FIG. 5.

When the user issues a transmission command under such a condition that the contents of the circular document is being displayed (step S5009 in FIG. 13), a destination list screen as exemplified in FIG. 10 is provided on the display part 61 and control is shifted to "memory transmission processing", even in this case. When the user issues a circular transmission command (step S5010 in FIG. 13), a group member list screen as exemplified in FIG. 12 is provided on the display part 61 and control is shifted to "circular transmission processing", even in this case. However, "circular transmission processing" in this case is carried out over a so-called child group containing its own station unlike the above circular member group.

Figure 15:
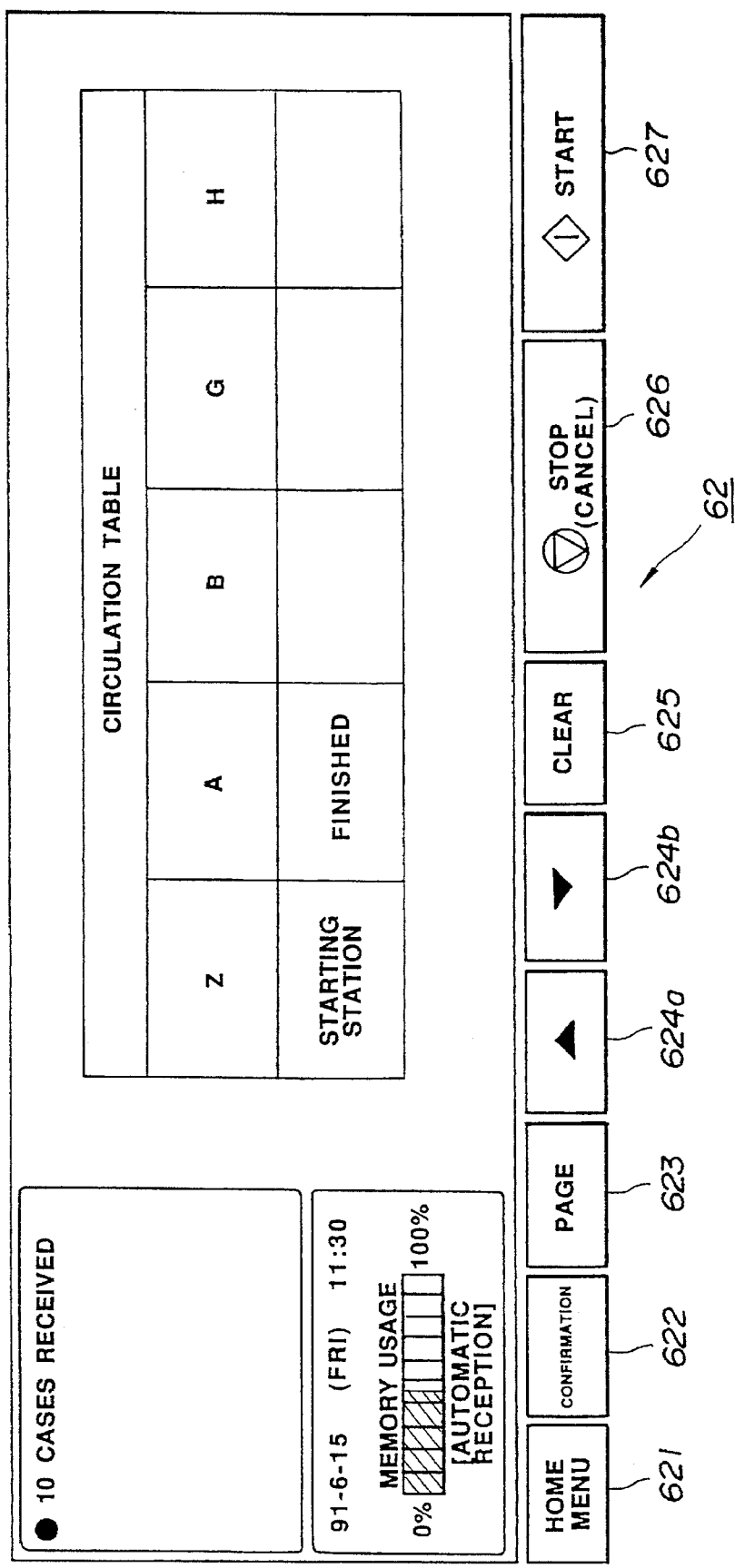
FIG. 15 illustrates an example of a circulation list on the screen of the display/input unit.

With the message display screen exemplified in FIG. 14, when the user of its own station presses the input region 618 of the display part 61 to issue a circulation table display command (step S6000 in FIG. 13), the main controller 3 of the associated station recognizes the command forms a circulation table image based on a previously prepared format through the input/output controller 9 and the write controller 8 on the basis of the contents of the above circulation table data registered in the management data memory 10, writes the formed image in the video buffer 7, and displays it on the display part 61 in a format as shown in FIG. 15 (step S6001 in FIG. 13). In this connection, the following are assumed in the circulation table image shown in FIG. 15.

E The circular starting station of the circular document is a station Z.

E Members A, B, G and H are specified as the circular destinations.

E The specified circular station order is A, B, G and H. E Of these circular destinations, the station A is already subjected to its circulation.

The circulation table image is erased by pressing the conformation key 622 and the display is returned to the message display screen of FIG. 14 (step S6002 in FIG. 13).

Incidentally, a facsimile equipment usually has a scanner (as in FIG. 1) for reading out a document to be transmitted. The facsimile equipment of the circular starting station can also use the input document data read out through the scanner 13 as the above circular document data.

Figure 16:
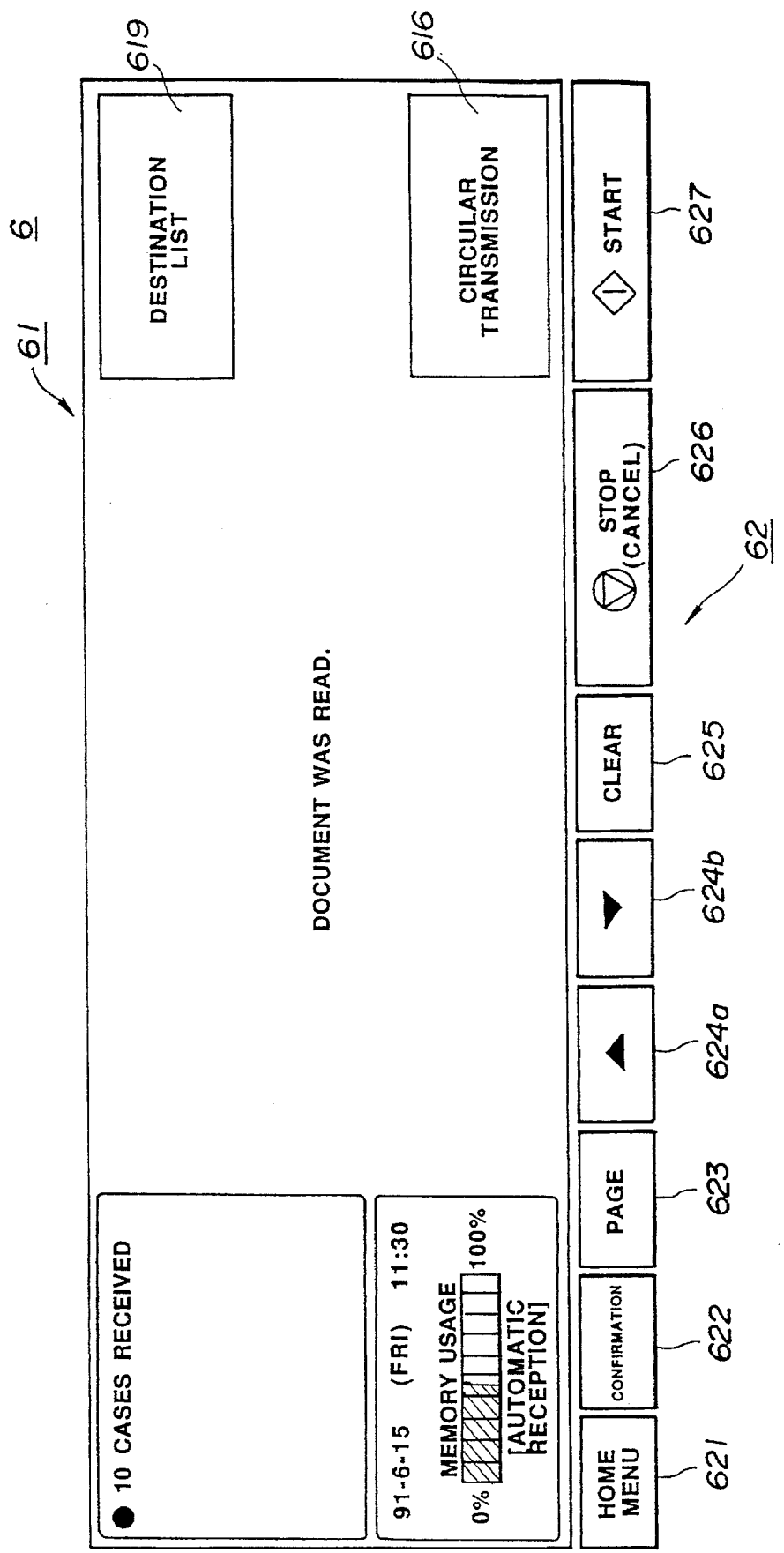
FIG. 16 illustrates an example of the screen of the display/input unit when the facsimile equipment of this embodiment read and inputted a document.

In this case, as shown in FIG. 6, when the facsimile equipment receives the document data read out through the scanner 13 (step S3000 in FIG. 6), the input document data is once stored in the image memory 4 (step S3001 in FIG. 6) various sorts of management data are registered together with the serial number (acceptation number) of the document data in the management data memory 10 (step S3002 in FIG. 6), as in the above. This results in that a message as shown in FIG. 16 as well as a press input region 619 for destination list display and a press input region 616 for circular transmitting processing are displayed on the display part 61. When the user presses the region 619 to issue a command for the destination list display (step S3004 in FIG. 6), a destination list screen as shown in FIG. 10 appears on the display part 61, and after the calling control over the later-designated destination (step S3005 in FIG. 6), known ordinary facsimile transmitting operation is carried out (step S3006 in FIG. 6). While, with the message screen of FIG. 16, when the user presses the region 616 to issue a circular transmission command (step S3004 in FIG. 6), a group member list screen as shown in FIG. 12 appears on the display part 61, after which control goes to "circular transmission processing" as explained in connection with FIG. 11.

Although the member candidates as the circular destinations have been previously registered as a group in "circular transmission processing" in the foregoing embodiment, the need for such group registration may be eliminated when the following procedure is previously determined between the circular start and relay stations.

(A) The circular starting station temporarily registers the destination data (destination names and destination numbers) of all the members specified as the circular destinations in the selected destination registration area 104 of the management data memory 10, and retrieves the destination number of the foremost circular destination member according to the set circulating order of the circular destination members (step S2407 in FIG. 11).

At the time of transmitting the circular document data, the circular starting station also transmits the destination data of all the circular destination members temporarily registered in the selected destination registration area 104, together with the above circulation table data. In this case, the circulation table data is prepared. In the earlier-mentioned example (in FIG. 4), in a format as given in a table below with respect to the its own station (circular starting station) and the stations specified as the circular destinations. ("Circular destination flag" becomes unnecessary.)

| Member | Starting Station Flag | Finished Flag |
| --- | --- | --- |
| Z | 1 | 0 |
| A | 0 | 0 |
| B | 0 | 0 |
| G | 0 | 0 |
| H | 0 | 0 |

(B) Each of the circular relay stations temporarily registers the circulation table data to be transmitted in the circulation table registration area 105 of the management data memory 10 and at the same time temporarily registers the destination data of all the circular destinations to be transmitted in the selected destination registration area 104 of the management data memory 10.

When retrieving the destination (circular destination) after the updating operation (refer to step S4005 in FIG. 13) of the circulation table data, the circular relay station compares the circulation table data with the destination data of all the circular destination temporarily registered in the selected destination registration area 104 and retrieves, on the basis of the comparison result, one of the specified circular destination members which has a finished flag of "0" and which is specified next to the its own station as well as its destination number. Even at the time of performing the calling and transmitting operation over the retrieved circular destination, the circular relay station transmits the destination data of all the circular destinations, together with the circular document data and circulation table data.

The storage structures of the respective memories, the display format and operating manner of the display/input unit 6 have been provided merely as example in the foregoing embodiment. Therefore, it goes without saying that these memory structures and the displaying and operating manners may be modified in various ways so long as such operation as explained with reference to FIGS. 6, 7, 9, 11 and 13 is realized.

What is claimed is:

1. A facsimile communication system having at least three facsimile machines connected to each other through a communication channel, wherein document data is transmitted sequentially to the at least three facsimile machines based on circulation table data attached to the document data and transmitted with the document data, at least one of the facsimile machines comprising:

an image memory for storing the document data;

input means for inputting a plurality of facsimile circular transmission destinations according to a circulation order, the circulation order defining an order for sequentially transferring the document data to the at least three facsimile machines;

first management data memory means for storing the circular transmission destinations and the circulation order as a new circulation table data;

second management data memory means for storing the circulation table data attached to the document data received from another one of the facsimile machines;

circulation table data updating means for updating the circulation table data received from another one of the facsimile machines by entering that circulation is finished at a portion of the circulation table data that shows the at least one of the facsimile machines as a circular transmission destination, and by deleting the at least one of the facsimile machines as a circular transmission destination from the circulation table data;

retrieval means for sequentially retrieving a next transmission destination on the basis of the new circulation table data or the updated circulation table data, the next transmission destination having the highest position in the circulation order among transmission destinations to which circulation has not finished;

calling control means for calling the next transmission destination, and if connection to the next transmission destination is unsuccessful, for sequentially calling the retrieved circular transmission destination having the subsequent highest position in the circulation order until interconnection to one of the circular transmission destinations is successful; and transmission control means for transmitting, to the circular transmission destination connected through the calling operation by the calling control means, the document data stored in the image memory and the new circulation table data, or the document data received with the circulation table data and the updated circulation table data, whereby the circulation order is updated according to the circulation table data received from the circular transmission destinations so that the document data is sequentially transmitted until the circulation table data indicates that circulation has finished to all of the circular transmission destinations.

2. A facsimile communication system as set forth in claim 1, said at least one of the facsimile machines further comprising:

display means for displaying at least various sorts of "help" data and data on the document data;

group memory means for storing destinations belonging to a as candidates of said destinations;

second input means for inputting a list display command for the facsimile transmission destinations registered in said group memory means; and first display control means, in response to an input of said facsimile transmission destination list from said second input means, for displaying on said display means the list of the facsimile transmission destinations registered in said group memory means in a predetermined format, wherein said first input means inputs some of the facsimile transmission destinations in the displayed list in an order corresponding to said circulation order.

3. A facsimile communication system as set forth in claim 2, wherein said group memory means is used also as destination data memory means for registering facsimile transmission destinations not belonging to said group as destination data, the facsimile transmission destinations belonging to said group being registered in said destination data memory means together with identifiers, and said first display control means, in response to an input of said facsimile transmission destination list display command from said second input means, displays on said display means a list of the facsimile transmission destinations attached by said identifiers.

4. A facsimile communication system as set forth in claim 1, further comprising second management data memory means for temporarily registering the destinations inputted by said first input means and their dial data, and wherein said transmission control means transmits said circulation table data and the dial data of the destinations together with said document data to the destination connected to the facsimile equipment through the calling operation.

5. A facsimile communication system as set forth in claim 1, wherein said circulation table data includes information indicative of the circular destinations including a circular starting station and the circulation order, a first flag indicative of said circular starting station on said information and a second flag indicative of presence or absence of reception of the circular document data on the information.

6. A facsimile communication system as set forth in claim 1, said at least one of the facsimile machines further comprising first display control means for displaying on said display means a visual data indicative of reception of the circular document data at its own station when said circulation table data is stored in said second management data memory means.

7. A facsimile communication system as set forth in claim 6, said at least one of the facsimile machines further comprising:

another input means for inputting a circulation table display command for the circular document data; and second display control means, in response to an input of said circulation table display command from said first input means, forms a circulation table image of a predetermined format indicative of all members of the circular destinations and circular states such as finished or non-finished circulation of each of the circular destinations on the basis of said updated circulation table data and for displaying said circulation table image on the display means.

8. A facsimile equipment as set forth in claim 1, wherein said retrieval means, when there is no circular destination to be circulated next to its own station, retrieves the starting station of the circular as a circular destination to be next circulated.

9. A facsimile communication system as set forth in claim 1, said at least one of the facsimile machines further comprising third management data memory means for temporarily storing the dial data of the received circular destination members, said circular document data being transmitted together with said circulation table data as attached by the dial data of all the members specified as the circular destinations, wherein said calling control means calls the dial data of the circular destination retrieved by said retrieval means by the dial data of the circular destination members temporarily stored in said third management data memory means, and said transmission control means transmits said updated circulation table data, the dial member of the circular destination members stored in said third management data memory means and said read-out circular document data to the circular destination connected to the facsimile equipment through the calling operation of the calling means.

10. A facsimile communication system as set forth in claim 9, wherein said retrieval means, when there is no circular destination to be circulated next to its own station, retrieves the starting station of the circular as a circular destination to be next circulated.

11. A facsimile communication system as set forth in claim 1, wherein said circulation table data include information indicative of the circular destinations including a circular starting station and the circulation order, a first flag indicative of said circular starting station on said information and a second flag indicative of presence or absence of reception of the circular document data on the information.

12. A facsimile machine connected to other facsimile machines through a communication channel, wherein document data is transmitted sequentially to the other facsimile machines based on circulation table data attached to the document data and transmitted with the document data, the facsimile machine comprising:

an image memory for storing document data;

input means for inputting a plurality of facsimile circular transmission destinations according to a circulation order, the circulation order defining an order for sequentially transferring the document data to the other facsimile machines;

first management data memory means for storing the circular transmission destinations and the circulation order as a new circulation table data;

second management data memory means for storing the circulation table data attached to the document data received from one of the other facsimile machines;

circulation table data updating means for updating the circulation table data received from one of the other facsimile machines by entering that circulation is finished at a portion of the circulation table data that shows the facsimile machine as a circular transmission destination, and by deleting the facsimile machine as a circular transmission destination from the circulation table data;

retrieval means for sequentially retrieving a next transmission destination on the basis of the new circulation table data or the updated circulation table data, the next transmission destination having the highest position in the circulation order among transmission destinations to which circulation has not finished;

calling control means for calling the next transmission destination and if connection to the next transmission destination is unsuccessful, for sequentially calling the retrieved circular transmission destination having the subsequent highest position in the circulation order until interconnection to one of the circular transmission destinations is successful; and transmission control means for transmitting, to the circular transmission destination connected through the calling operation by the calling control means, the document data stored in the image memory and the new circulation table data, or the document data received with the circulation table data and the updated circulation table data, whereby the circulation order is updated according to the circulation table data received from the circular transmission destinations so that the document data is sequentially transmitted until the circulation table data indicates that the circulation has finished to all of the circular transmission destinations.

* * * * *